(12) United States Patent
Kezobo et al.

(10) Patent No.: US 10,315,692 B2
(45) Date of Patent: Jun. 11, 2019

(54) CONTROL DEVICE FOR ROTARY MACHINE, AND ELECTRIC POWER STEERING APPARATUS

(71) Applicant: Mitsubishi Electric Corporation, Tokyo (JP)

(72) Inventors: Isao Kezobo, Tokyo (JP); Yoshihiko Kimpara, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/912,185

(22) PCT Filed: Nov. 13, 2013

(86) PCT No.: PCT/JP2013/080671
§ 371 (c)(1),
(2) Date: Feb. 16, 2016

(87) PCT Pub. No.: WO2015/071974
PCT Pub. Date: May 21, 2015

(65) Prior Publication Data
US 2016/0200352 A1 Jul. 14, 2016

(51) Int. Cl.
*H02P 21/18* (2016.01)
*B62D 5/04* (2006.01)
(Continued)

(52) U.S. Cl.
CPC ............. *B62D 5/049* (2013.01); *H02P 21/16* (2016.02); *H02P 21/18* (2016.02); *H02P 21/20* (2016.02); *H02P 29/0241* (2016.02); *H02P 29/50* (2016.02)

(58) Field of Classification Search
CPC ..... B60W 2050/0215; B60W 2050/021; H02P 21/20
See application file for complete search history.

(56) References Cited

U.S. PATENT DOCUMENTS 5,020,617 A 6/1991 Oshita et al.
8,989,966 B2 * 3/2015 Itamoto .................. B62D 5/049
701/43

(Continued)

FOREIGN PATENT DOCUMENTS

EP 1 728 705 A2 12/2006
JP 2668235 B2 10/1997
(Continued)

OTHER PUBLICATIONS

Communication dated Jan. 24, 2017 issued by the Japanese Patent Office in counterpart application No. 2015-547321.
(Continued)

*Primary Examiner* — Bickey Dhakal
(74) *Attorney, Agent, or Firm* — Sughrue Mion, PLLC; Richard C. Turner

(57) ABSTRACT

Provided is a control device for a rotary machine including: a power feed unit configured to feed electric power in accordance with a power feed command to a rotary machine; a rotation-state detecting unit configured to detect a rotation state of the rotary machine; a torque detecting unit configured to detect an output torque output from the rotary machine; an abnormality determining unit configured to determine an abnormality in the rotation-state detecting unit or the torque detecting unit; and an excitation-command generating unit configured to generate an excitation command for oscillating the rotary machine, in which the power feed command is generated based at least on the excitation command, and the abnormality determining unit is configured to determine the abnormality in the detecting units based on a response of the rotation state and a response of the output torque to the excitation command.

18 Claims, 21 Drawing Sheets

(51) Int. Cl.
*H02P 21/20* (2016.01)
*H02P 21/16* (2016.01)
*H02P 29/50* (2016.01)
*H02P 29/024* (2016.01)

(56) References Cited

U.S. PATENT DOCUMENTS

| | | | |
|---|---|---|---|
| 2006/0278467 A1 | 12/2006 | Endo et al. | |
| 2008/0017439 A1* | 1/2008 | Sawada | B62D 5/0472 180/446 |
| 2013/0253773 A1 | 9/2013 | Itamoto et al. | |
| 2013/0289826 A1* | 10/2013 | Yoshitake | B62D 5/049 701/42 |
| 2015/0175193 A1* | 6/2015 | Endo | B62D 5/0487 701/29.2 |
| 2015/0226627 A1* | 8/2015 | Kuwahara | B62D 5/049 701/41 |

FOREIGN PATENT DOCUMENTS

| | | |
|---|---|---|
| JP | 11-059469 A | 3/1999 |
| JP | 2007-015680 A | 1/2007 |
| JP | 2007-091069 A | 4/2007 |
| JP | 2011-051456 A | 3/2011 |
| JP | 2012-25262 A | 2/2012 |
| JP | 2012-228922 A | 11/2012 |
| JP | 2013-141863 A | 7/2013 |
| WO | 2012/108525 A1 | 8/2012 |

OTHER PUBLICATIONS

International Search Report for PCT/JP2013/080671 dated May 22, 2012 [PCT/ISA/210].
Written Opinion for PCT/JP2013/080671 dated May 22, 2012 [PCT/ISA/237].
Communication dated Oct. 23, 2017 from the European Patent Office in counterpart Application No. 13897312.8.

* cited by examiner

CONTROL DEVICE FOR ROTARY MACHINE, AND ELECTRIC POWER STEERING APPARATUS

CROSS REFERENCE TO RELATED APPLICATIONS

This application is a National Stage of International Application No. PCT/JP2013/080671 filed Nov. 13, 2013, the contents of all of which are incorporated herein by reference in their entirety.

TECHNICAL FIELD

The present invention relates to a control device for a rotary machine and the like, and more particularly, to detection of a failure of the control device for a rotary machine.

BACKGROUND ART

As a related-art apparatus of this type of technology, in Patent Literature 1, there is disclosed an electric power steering apparatus configured to determine that a torque signal of a torque sensor is abnormal when such a situation continues for a given time period or longer that an absolute value of the torque signal is smaller than a predetermined value in the vicinity of zero, a steering speed of a steering wheel (that is, a rotation speed of a load) is equal to or larger than a given value, and a steering angle (that is, a rotation angle of the load) is in an increasing direction, and detect an abnormality based on a kind of consistency between the torque signal of the torque sensor and a rotation state.

Further, in Patent Literature 2, there is similarly disclosed an electric power steering apparatus configured to apply an instantaneous motor torque for abnormality detection, and detect an abnormality in a sensor signal of a torque sensor when the application of the instantaneous motor torque is not reflected in the sensor signal of the torque sensor.

As an example of another general and basic apparatus, there exists the one that includes two systems for each sensor to detect an abnormality in each sensor through mutual comparison therebetween. For example, the apparatus includes two-system torque detecting units and detects an abnormality occurring in the torque detecting unit of any one of the systems through mutual comparison therebetween. Some apparatus also include two-system rotation-state detecting units.

CITATION LIST

Patent Literature

[PTL 1] JP 2668235 B2
[PTL 2] JP 2011-51456 A

SUMMARY OF INVENTION

Technical Problem

In the apparatus of Patent Literature 1, the abnormality is detected based on a basic control response generated along with a general operation without application of a signal for abnormality detection. Therefore, while the rotation is being stopped or in an operating state in which the torque increases during the rotation, the abnormality cannot be detected. Thus, there is a problem in that it cannot be known when the state turns into an abnormality detectable state and it is necessary to wait until the state of operation turns into the abnormality detectable state.

Further, in the apparatus of Patent Literature 2, the abnormality is detected based on whether or not the instantaneous motor torque for abnormality detection is reflected in the sensor signal of the torque sensor. For example, if a magnitude of friction changes in accordance with a load state or the like, the instantaneous motor torque is attenuated due to friction and does not respond as an actual torque in some cases. In this case, even when the torque sensor is normal, the response of the instantaneous motor torque does not appear in the sensor signal. Therefore, there is a problem of fear that allowance for false detection is reduced, the false detection being an erroneous detection of the abnormality, although the torque sensor signal is actually normal.

Further, the system described above as the general example, that is, the apparatus including the two systems for each sensor, has a problem in that sensor costs are doubled to increase apparatus costs.

The present invention has been made to solve the problems described above, and therefore has an object to provide a control device for a rotary machine and the like, capable of extending an abnormality detectable operating state to a wide range and improving abnormality detection accuracy, while keeping down costs.

Solution to Problem

According to one embodiment of the present invention, there are provided a control device for a rotary machine and the like, including: a power feed unit configured to feed electric power in accordance with a power feed command to a rotary machine; a rotation-state detecting unit configured to detect a rotation state of the rotary machine; a torque detecting unit configured to detect an output torque output from the rotary machine; an abnormality determining unit configured to determine an abnormality in the rotation-state detecting unit or the torque detecting unit; and an excitation-command generating unit configured to generate an excitation command for oscillating the rotary machine, in which the power feed command is generated based at least on the excitation command, and the abnormality determining unit is configured to determine the abnormality in the detecting units based on a response of the rotation state and a response of the output torque to the excitation command.

Advantageous Effects of Invention

According to the one embodiment of the present invention, it is possible to provide the control device for a rotary machine and the like, capable of extending an abnormality detectable operating state to a wide range and improving abnormality detection accuracy, while keeping down costs.

DESCRIPTION OF EMBODIMENTS

Figure 1:
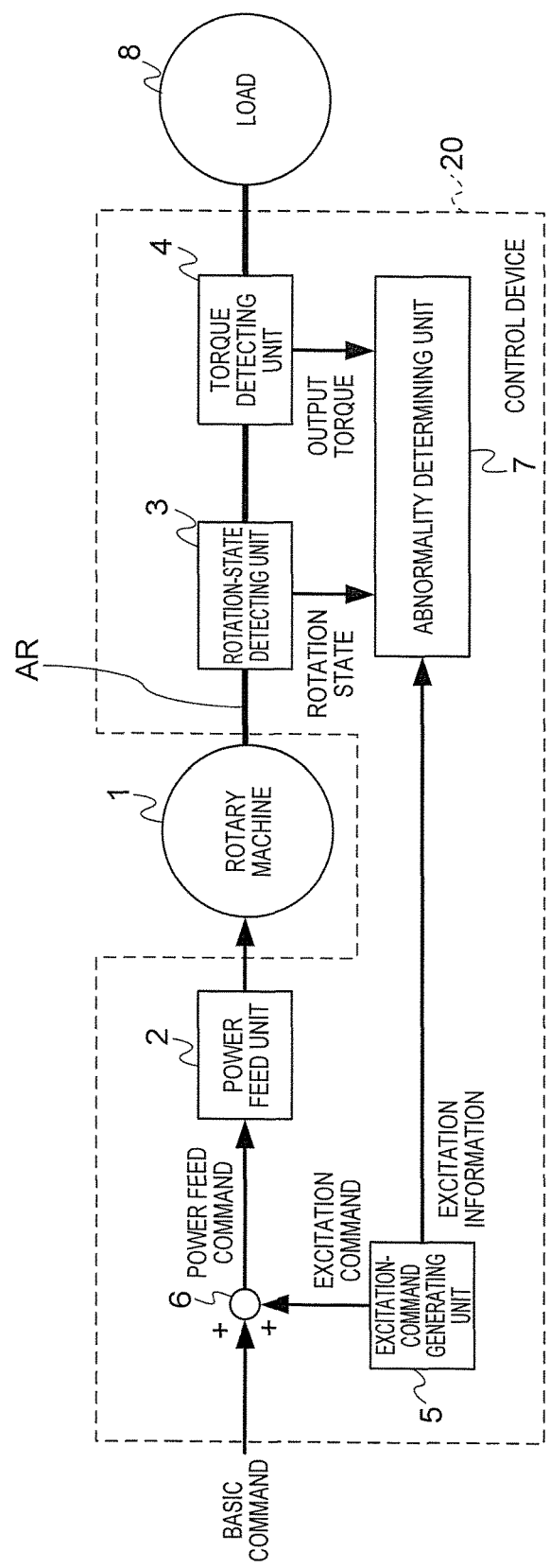
FIG. 1 is a block diagram for illustrating a configuration of a control device for a rotary machine according to a first embodiment of the present invention and a periphery thereof.

According to the present invention, electric power to a rotary machine is controlled based on an excitation command. Responses of two or more kinds of detecting units for the excitation command are mutually referred to, to thereby detect an abnormality. In this manner, in a case where the response to the excitation command is reduced due to a non-abnormal fluctuation such as an increase in friction of a rotary shaft, an actual oscillation amplitude decreases to reduce the responses of all the detecting units. Therefore, there is no fear of false detection of the abnormality in the response, thereby enabling enhancement of detection accuracy. Further, the rotary machine is intentionally oscillated by the excitation command, and hence an abnormality detectable operating state can be extended to a wide range.

Further, hitherto, there exist devices configured to detect an abnormality by mutually referring to detection signals of a plurality of detecting units configured to detect the same state variable. In the present invention, however, signals of detecting units configured to respectively detect different state variables corresponding to a torque and a rotation state are mutually referred to, to thereby detect the abnormality. In this manner, a structure is not required to be formed redundant without including two systems for each detecting unit. Thus, a configuration can be simplified to enable cost reduction.

Now, a control device for a rotary machine and the like according to each of embodiments of the present invention are described referring to the drawings. In each of the embodiments, the same or corresponding parts are denoted by the same reference symbols, and the overlapping description thereof is herein omitted.

First Embodiment

FIG. 1 is a block diagram for illustrating a configuration of a control device for a rotary machine according to a first embodiment of the present invention and a periphery thereof. In FIG. 1, on the periphery of a control device 20, a rotary machine 1 and a load 8 are provided. The load 8 is a target to be fed with a torque output from the rotary machine 1 and only needs to be supposed as one of various rotary inertia bodies used in accordance with applications. The load 8 is not a constituent element of the present invention. The rotary machine 1 is a generally known one such as a permanent-magnet synchronous electric motor, an electric motor with a DC brush, and an induction electric motor.

The control device 20 supplies electric power that is controlled based on a basic command described later to the rotary machine 1 to cause the rotary machine 1 to output a desired torque.

A power feed unit 2 included in the control device 20 supplies electric power to the rotary machine 1 based on a power feed command described later. In this embodiment, the power feed command is a command for a current that is caused to flow through the rotary machine 1 and also referred to as "current command".

Figure 3:
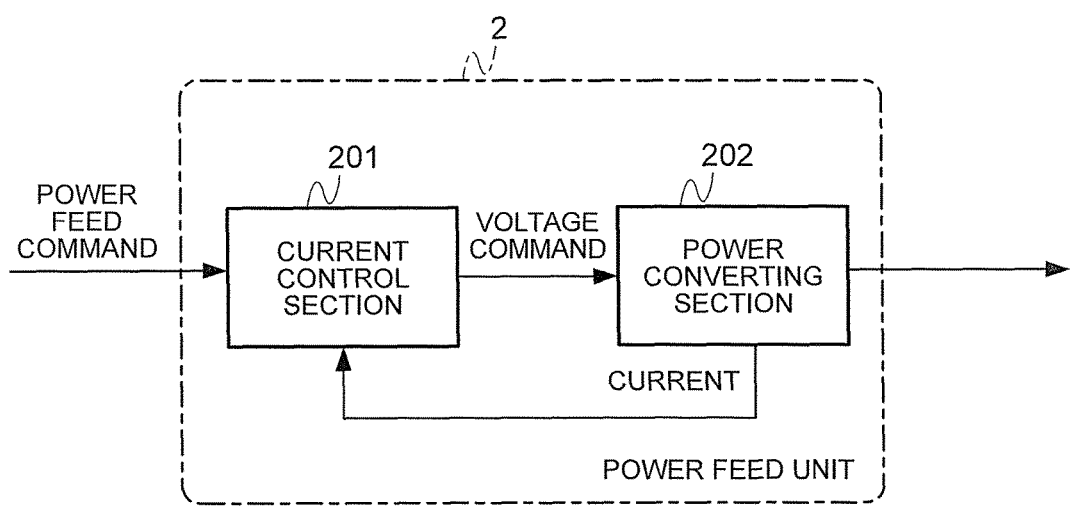
FIG. 3 is a block diagram for illustrating an example of a configuration of a power feed unit according to the first embodiment of the present invention.

FIG. 3 is a block diagram for illustrating an example of a configuration of the power feed unit according to the first embodiment of the present invention. The power feed unit 2 includes a current control section 201 and a power converting section 202, as illustrated in FIG. 3. The power converting section 202 supplies a current to the rotary machine 1 based on a voltage command output from the current control section 201. The current control section 201 controls the voltage command based on the current flowing through the rotary machine 1 and the power converting section 202 and on the power feed command so that the current follows the power feed command.

A rotation-state detecting unit 3 and a torque detecting unit 4 are connected to a rotary shaft AR of the rotary machine 1. The rotation-state detecting unit 3 detects a rotational position θm of the rotary shaft AR of the rotary machine 1 as a rotation state. The torque detecting unit 4 detects a torque that is generated in the rotary machine 1 and transmitted to the load 8, that is, an output torque Ts.

The basic command is a command corresponding to a basic rotating operation in accordance with an application of the rotary machine 1. An adder unit 6 constructing a power-feed-command generating unit adds an excitation command to be used for detection of an abnormality to the basic command to compute the power feed command. The excitation command is generated in an excitation-command generating unit 5 for a purpose of detecting the abnormality generated in the rotation-state detecting unit 3 and the torque detecting unit 4. The excitation command used in this embodiment is a sine wave expressed as follows.

$$Ae \cdot \sin(\omega e \cdot t + \phi e)$$

Ae: excitation amplitude
ωe: excitation frequency
φe: excitation phase

By the power feed command obtained by superimposing the excitation command, oscillatory electric power is fed to the rotary machine 1. As a response thereto, an oscillatory output torque is output, and the rotational position θm oscillates. In the present invention, the response of the rotational position θm and the response of the output torque Ts to the excitation command are mutually referred to, and then consistency therebetween is determined, thereby detecting the abnormality occurring in any one of the rotation-state detecting unit 3 and the torque detecting unit 4.

Further, the excitation-command generating unit 5 also outputs excitation information that is information included in the excitation command. Although the excitation command in the present invention represents the excitation amplitude Ae, the excitation frequency ωe, the excitation phase φe, and the excitation command itself, only the excitation frequency ωe is represented by the excitation command in this embodiment.

An abnormality determining unit 7 included in the control device 20 performs computation processing on the rotational position θm detected by the rotation-state detecting unit 3 and the output torque Ts detected by the torque detecting unit 4 based on the excitation frequency we to mutually compare the rotational position and the output torque so as to determine the consistency therebetween. In this manner, the abnormality generated in the rotation-state detecting unit 3 and the torque detecting unit 4 is detected.

Figure 2:
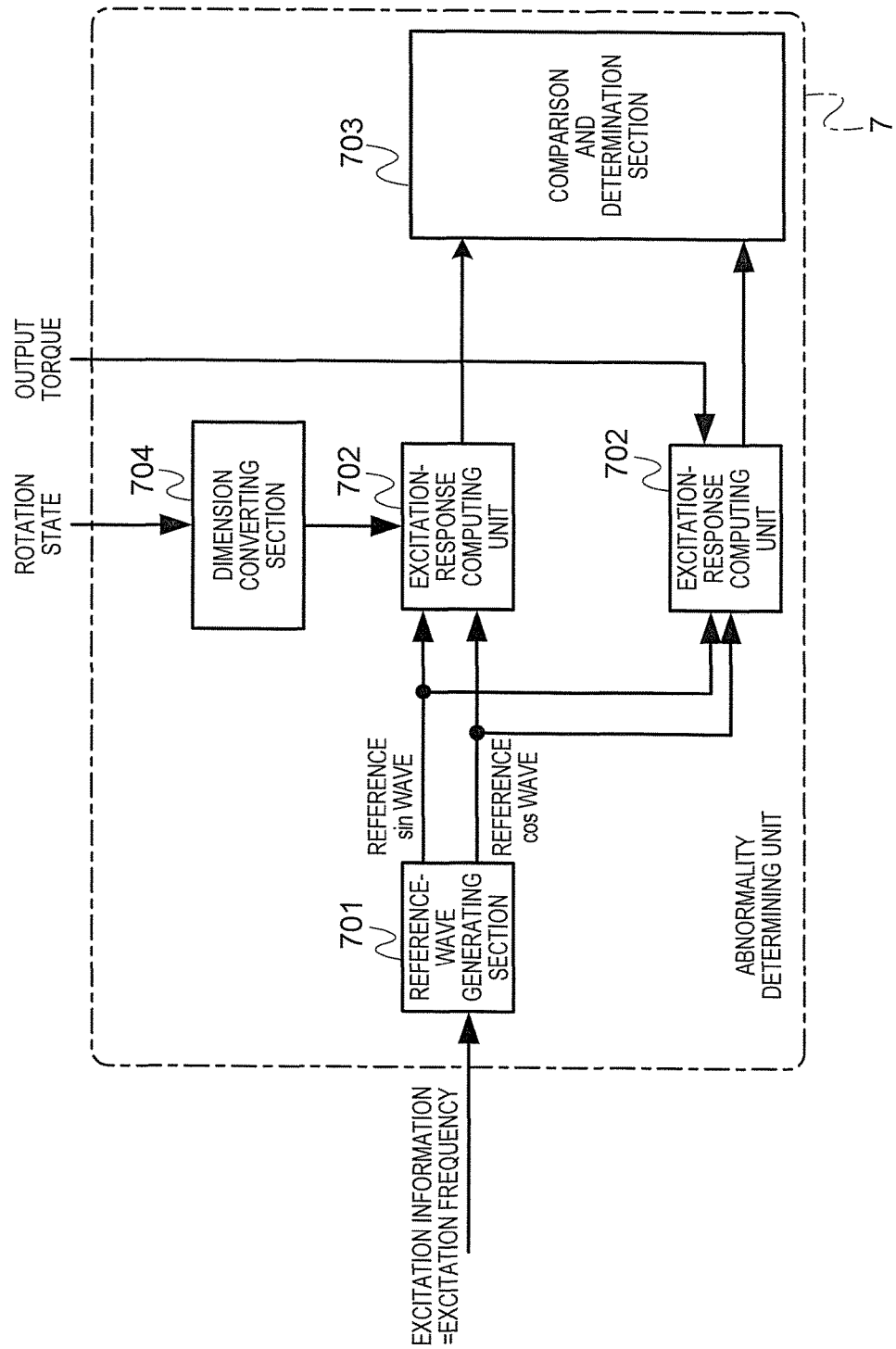
FIG. 2 is a block diagram for illustrating an example of a configuration of an abnormality determining unit according to the first embodiment of the present invention.

FIG. 2 is a block diagram for illustrating an example of a configuration of the abnormality determining unit according to the first embodiment of the present invention. In FIG. 2, a reference-wave generating section 701 generates reference waves including a reference sin wave and a reference cos wave based on the excitation frequency. It is assumed that the reference sin wave is expressed by sin(ωe·t) and the reference cos wave is expressed by cos(ωe·t). A dimension converting section 704 performs conversion so that a dimension of the rotational position θm becomes the same as that of the output torque Ts. The rotational position is multiplied by a conversion gain that is a constant to calculate the rotational position after conversion as a converted rotational position θt. It is known that the torque detected in the torque detecting unit 4 is generally proportional to a torsion angle of the rotary shaft AR included in the torque detecting unit 4. The detected torque is proportional to the rotational position θm at a certain oscillation frequency. Therefore, the conversion gain is set to a value equal to a rigidity constant of the rotary shaft AR of the torque detecting unit 4.

In place of the dimension converting section 704, a dimension converting section (not shown) configured to perform conversion so that the dimension of the output torque Ts becomes the same as that of the rotational position θm may be provided.

Two excitation-response computing units 702 (excitation-response computing sections) include an excitation-response computing unit configured to compute the response of the rotational position to the excitation command as an excitation response based on the converted rotational position θt and the reference waves (reference sin wave and reference cos wave) and an excitation-response computing unit configured to compute the response of the output torque to the excitation command as an excitation response based on the output torque Ts and the reference waves (reference sin wave and reference cos wave).

Figure 4:
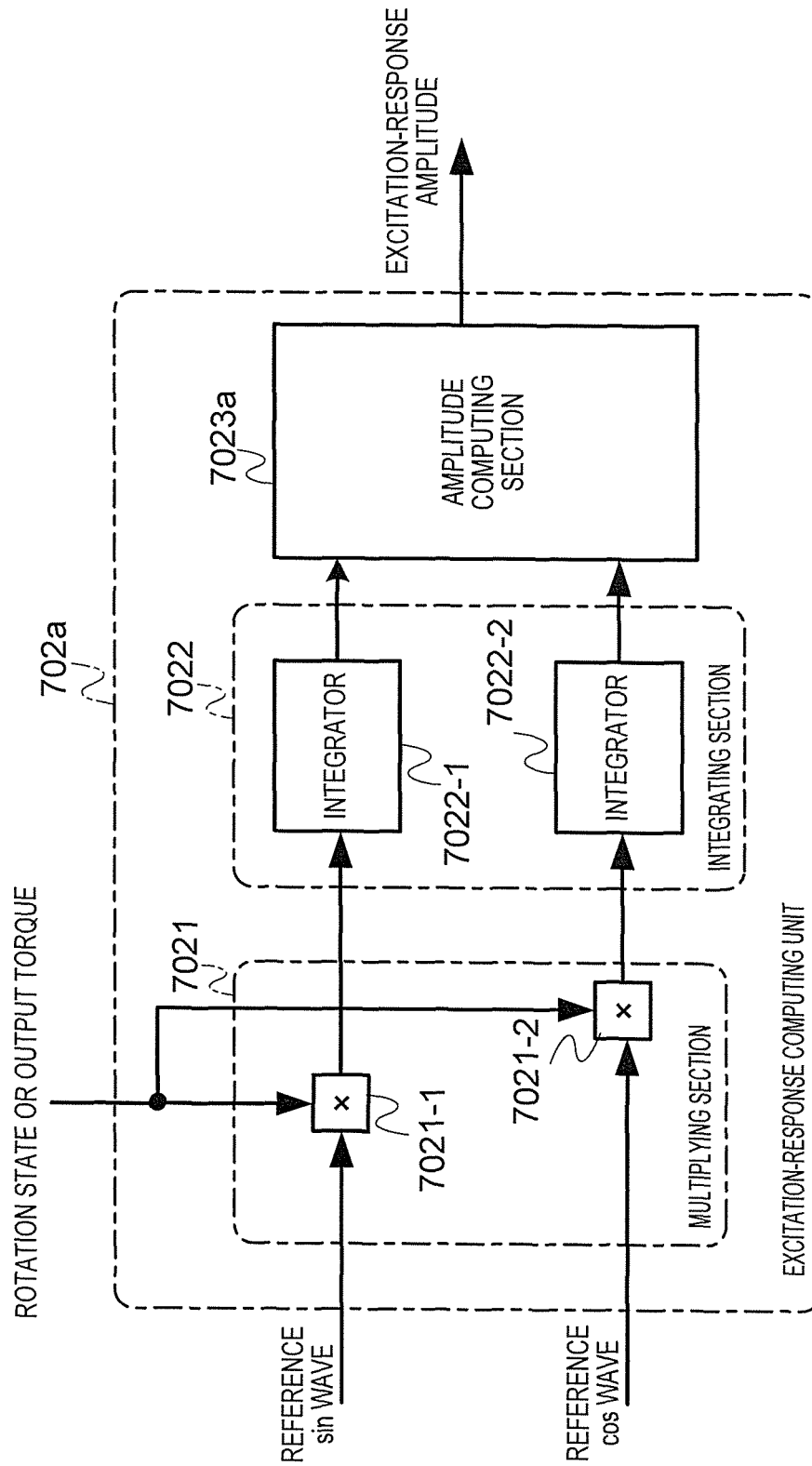
FIG. 4 is a block diagram for illustrating an example of a configuration of an excitation-response computing unit according to the first embodiment of the present invention.

FIG. 4 is a block diagram for illustrating an example of a configuration of the excitation-response computing unit according to the first embodiment of the present invention. The two excitation-response control units 702 have the same configuration illustrated as, for example, an excitation-response computing unit 702a in FIG. 4. In a multiplying section 7021, the reference sin wave and the reference cos wave are multiplied by the rotation state or the output torque respectively in multipliers 7021-1 and 7021-2 to compute a multiplication value of the reference sin wave and the rotation state and a multiplication value of the reference cos wave and the rotation state, or a multiplication value of the reference sin wave and the output torque and a multiplication value of the reference cos wave and the output torque. The computed multiplication values are respectively integrated in integrators 7022-1 and 7022-2 included in an integrating section 7022. Integrated signals output from the integrating section 7022 are amplitude values of the responses to the excitation frequency, which have phases respectively corresponding to the reference sin wave and the reference cos wave, that is, the amplitude values at the excitation frequency.

An amplitude computing section 7023a raises the two integrated signals that are orthogonal to each other to the second power, obtains a sum thereof, and computes a square root of the sum. In this manner, an amplitude of the response of the converted rotational position θt or the output torque Ts to the excitation command, that is, an excitation-response amplitude is calculated.

Returning to FIG. 2, a comparison and determination section 703 compares the excitation-response amplitude of the converted rotational position θt and the excitation-response amplitude of the output torque Ts based on the excitation-response amplitudes output from the excitation-response computing units 702 and determines whether or not a difference therebetween exceeds a predetermined value that is determined within a normal error range. In a case where a time period in which the difference exceeds the predetermined value becomes a predetermined time period or longer (state in which the difference exceeds the predetermined value lasts for the predetermined period or longer), it is determined that an abnormality occurs in the rotation-state detecting unit 3 or the torque detecting unit 4.

Figure 5:
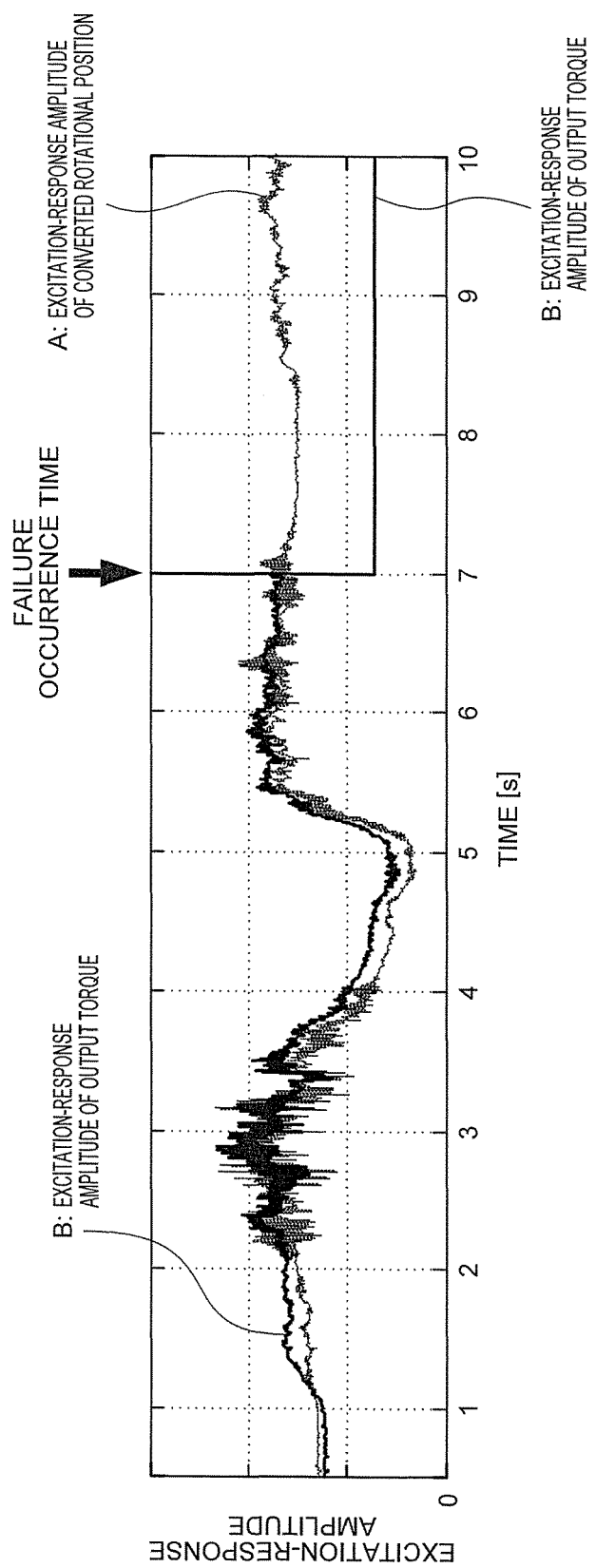
FIG. 5 is a graph for showing an example of time response waveforms of excitation-response amplitudes according to the first embodiment of the present invention.

FIG. 5 is a graph for showing an example of time response waveforms of the excitation-response amplitudes according to the first embodiment of the present invention. Temporal changes of the waveforms in a case where the abnormality is detected by using the control device according to the present invention are as shown in FIG. 5. In FIG. 5, the horizontal axis indicates elapsed time, whereas the vertical axis indicates the excitation-response amplitude. The thin line A indicates the excitation-response amplitude of the converted rotational position θt, whereas the thick line B indicates the excitation-response amplitude of the output torque Ts. Until a failure occurs around 7 seconds, the two excitation-response amplitudes exhibit approximately equal values. However, after the occurrence of the failure of the torque detecting unit 4 around 7 seconds, it is understood that only the excitation-response amplitude of the output torque Ts exhibits a small value and therefore a difference between the two excitation-response amplitudes increases. By determining the difference and counting the time period of the difference for the predetermined time period or longer by the comparison and determination section 703, the abnormality can be determined.

Now, take note of a time of around 5 seconds. In the vicinity thereof, the two excitation-response amplitudes both exhibit extremely small values. Specifically, it is shown that the output torque Ts and the rotation state θm scarcely respond to the excitation command. The reason is as follows. A state of the load 8 changes to increase friction on the rotary shaft AR. As a result, the torque of the rotary machine 1, which is generated in response to the excitation command, is attenuated until the torque is transmitted to the output torque detected by the torque detecting unit 4 and also until the torque is transmitted to the rotation state detected by the rotation-state detecting unit 3, and hence the excitation-response amplitudes decrease. As described above, the responses until the excitation command is transmitted to the output torque and the rotation state change in accordance with a non-abnormal fluctuation such as a load state or friction, which occurs in a normal state. Thus, by detecting the abnormality through mutual reference of the responses until the excitation command is transmitted to the output torque and the rotation state as in the present invention, the abnormality can be detected precisely without false detection of a normal state as being abnormal.

On the other hand, if the abnormality is intended to be detected with only one sensor response as in the case of the apparatus of Patent Literature 2, in a case of a large friction state as described above, there is a fear in that, until an instantaneous torque serving as the excitation command is transmitted to the sensor signal, the response is attenuated to result in the excitation-response amplitude having an extremely small value, which is erroneously determined as being abnormal. For example, the above-mentioned state corresponds to a state at the time of around 5 seconds shown in FIG. 5. The excitation-response amplitude of the output torque at this time is approximately equal to a value after the time of 7 seconds, that is, after the occurrence of the failure, and therefore it is difficult to determine whether the state is abnormal or normal. Therefore, in order to avoid the above-mentioned false detection in the related art, the instantaneous torque for abnormality detection is required to be set to a value that is large enough not to be buried in the friction. Thus, there is a problem in that uncomfortable oscillation increases. Further, if the apparatus as disclosed in Patent Literature 2 intends to avoid the false detection by another method, a threshold value of the amplitude used for the determination of an abnormal response to the excitation is required to be dealt with by, for example, setting the threshold value to an extremely small value. Therefore, even at a response level (for example, an output-torque response after 7 seconds shown in FIG. 7) that is principally desired to be immediately determined as being abnormal, the abnormality cannot be detected. Thus, it is necessary to wait until the value of the response becomes extremely small so that the abnormality can be detected.

According to this embodiment, in a case where the responses of the detecting units to the excitation command fluctuate in accordance with the non-abnormal fluctuation such as the load state and the friction, there is no fear of false detection of the fluctuation as being abnormal. Thus, when the response of the output torque and the response of the rotation state to the excitation command have an abnormally diverging relationship, the abnormality can be detected. Thus, the effect in extremely high detection accuracy is provided.

Further, as in Patent Literature 1, if the consistency between the output torque and the rotation state is intended to be determined only with the basic command without using the excitation command, it is necessary to wait until the state of the operation turns into a specific state in which the abnormality is detectable. According to the configuration of this embodiment, however, the rotary machine is intentionally oscillated in response to the excitation command. Therefore, the abnormality detectable operating state can be extended to a wide range.

As described above, the control device for a rotary machine according to the present invention includes the power feed unit 2 configured to feed the electric power in accordance with the power feed command to the rotary machine 1, the rotation-state detecting unit 3 configured to detect the rotation state of the rotary machine 1, the torque detecting unit 4 configured to detect the output torque output from the rotary machine 1, the abnormality determining unit 7 configured to determine the abnormality in the rotation-state detecting unit 3 or the torque detecting unit 4, and the excitation-command generating unit 5 configured to generate the excitation command for oscillating the rotary machine 1. The power feed command is generated at least on the excitation command, while the abnormality determining unit 7 determines the abnormality based on the response of the rotation state and the response of the output torque to the excitation command.

In the above-mentioned manner, the detection signals of the torque detecting unit 4 and the rotation-state detecting unit 3 configured to respectively detect different state variables of the rotary machine 1 can be approximately constantly mutually referred to, to thereby detect the abnormality in any one thereof with high accuracy. In the related art, if the detection signals of the torque detecting unit and the rotation-state detecting unit configured to respectively detect different state variables of the rotary machine are intended to be mutually referred to, the abnormality detectable operating range becomes limitative. In the present invention, however, the responses of the detecting units 3 and 4 to the excitation command are mutually referred to. Therefore, the detection of the abnormality is enabled approximately constantly. Further, each of the detecting units 3 and 4 is not configured as two systems, and therefore the same state variable of the rotary machine 1 is not doubly detected for mutual reference. Hence, costs can be reduced.

Further, the excitation-command generating unit 5 outputs a feature quantity of the excitation command as the excitation information, and the abnormality determining unit 7 determines the abnormality based on the excitation information. As a result, the responses of the detecting units 3 and 4 to the excitation command can be extracted with high accuracy to enable enhancement of abnormality detection accuracy.

Further, the excitation command contains the sine wave, the excitation information is the frequency of the excitation command, and the abnormality determining unit 7 determines the abnormality based on the excitation information. In this manner, the responses of the detecting units 3 and 4 to the excitation command can be extracted exclusively at the frequency of the excitation command. Therefore, the responses can be extracted with high accuracy to enable the enhancement of the abnormality detection accuracy.

Further, the abnormality determining unit 7 determines the abnormality based on the amplitudes of the response of the rotation state and the response of the output torque to the excitation command. In this manner, the abnormality can be determined based only on the amplitudes, excluding other information such as the phase from the components of the responses of the detecting units 3 and 4 to the excitation command. Therefore, the determination can be made in a simple manner in the simple determining unit.

Further, the excitation-command generating unit 5 uses the frequency $\omega e$ of the excitation command as the excitation information, and the abnormality determining unit 7 computes the amplitudes of the response of the rotation state and the response of the output torque to the excitation command based on the frequency of the excitation command to determine the abnormality based on the amplitudes. In this manner, the responses of the detecting units 3 and 4 to the excitation command at the frequency of the excitation command are analyzed so that only the amplitudes at the frequency can be extracted. Therefore, unnecessary components can be excluded to enable the extraction of the responses with high accuracy. As a result, the abnormality detection accuracy can be enhanced.

Further, the abnormality determining unit 7 determines the abnormality based on the value obtained by multiplying the response of the rotation state or the response of the output torque to the excitation command by the correction gain. In this manner, a property of being capable of converting the detection signals of the torque detecting unit 4 and the rotation-state detecting unit 3 configured to detect the different state variables of the rotary machine 1 into the same dimension at the frequency of the excitation command can be used. Therefore, the mutual comparison and reference can be performed on the same dimension, and hence the abnormality can be determined approximately constantly without providing two systems for each of the detecting units 3 and 4.

Further, the power feed command is obtained by superimposing the excitation command onto the basic command for causing the rotary machine 1 to make basic rotation. In this manner, the basic command is set so as to allow the rotary machine 1 to realize various desired operating states. In addition, the oscillation for the abnormality determination can be caused by the excitation command. Thus, the abnormality detectable operating state can be extended to the wide range to enable the abnormality detection approximately constantly.

Further, hitherto, there exist the ones configured to mutually refer to the detection signals of the plurality of detecting units configured to detect the same state variable to detect the abnormality. In the present invention, however, the signals of the detecting units configured to detect the different state variables respectively corresponding to the torque and the rotation state are mutually referred to, to thereby detect the abnormality. Therefore, redundancy such as two systems provided for each of the detecting units 3 and 4 is not required. As a result, the configuration can be simplified to reduce the costs.

By setting the excitation amplitude Ae larger than a maximum friction torque applied to the rotary shaft AR, the responses at the amplitude equal to or larger than zero appear in the detecting units 3 and 4 respectively for the rotation state and the output torque. Therefore, the range in which the abnormality can be detected is enlarged by setting the excitation amplitude Ae larger than the maximum friction torque applied to the rotary shaft AR. On the other hand, the oscillation increases to provide discomfort in some cases. Thus, the excitation amplitude Ae only needs to be set to a magnitude in accordance with an application. By setting the excitation amplitude at least larger than a minimum friction torque applied to the rotary shaft AR, the abnormality can be detected according to the present invention. In the case of the apparatus configured to apply the instantaneous motor torque for abnormality detection as disclosed in Patent Literature 2, if a test pulse is small, the pulse is attenuated due to friction to result in no response. As a result, it becomes difficult to detect the abnormality. According to the present invention, however, there is no fear of false detection of the abnormality.

The excitation frequency $\omega e$ only needs to be defined within a range of the frequency in which the response of the output torque and the response of the rotation state to the power feed command are approximately equal. The range differs depending on the load 8 to which the rotary machine 1 is connected or the like, and is desired to be set to a range higher than a resonance frequency determined based on an inertia of the rotary machine 1 and rigidities of the rotary shaft AR and shafts of the detecting units 3 and 4.

In general, the excitation phase $\Phi e$ only needs to be set to zero. In a case where the power feed command is a two-component vector, the excitation command can also be set as a two-component vector and may be set as sine waves respectively having excitation phases having a phase difference of 90 degrees.

Although the sine wave is used as the excitation command in the description given above, any shape such as a rectangular wave or a trapezoidal wave may be used as long as the oscillation is applied to the rotary machine 1. The abnormality determining unit 7 can detect the abnormality through the same processing only except that the response has an obtuse waveform as if after passage through a low-pass filter until responding to the rotation state or the output torque is made.

Second Embodiment

Figure 6:
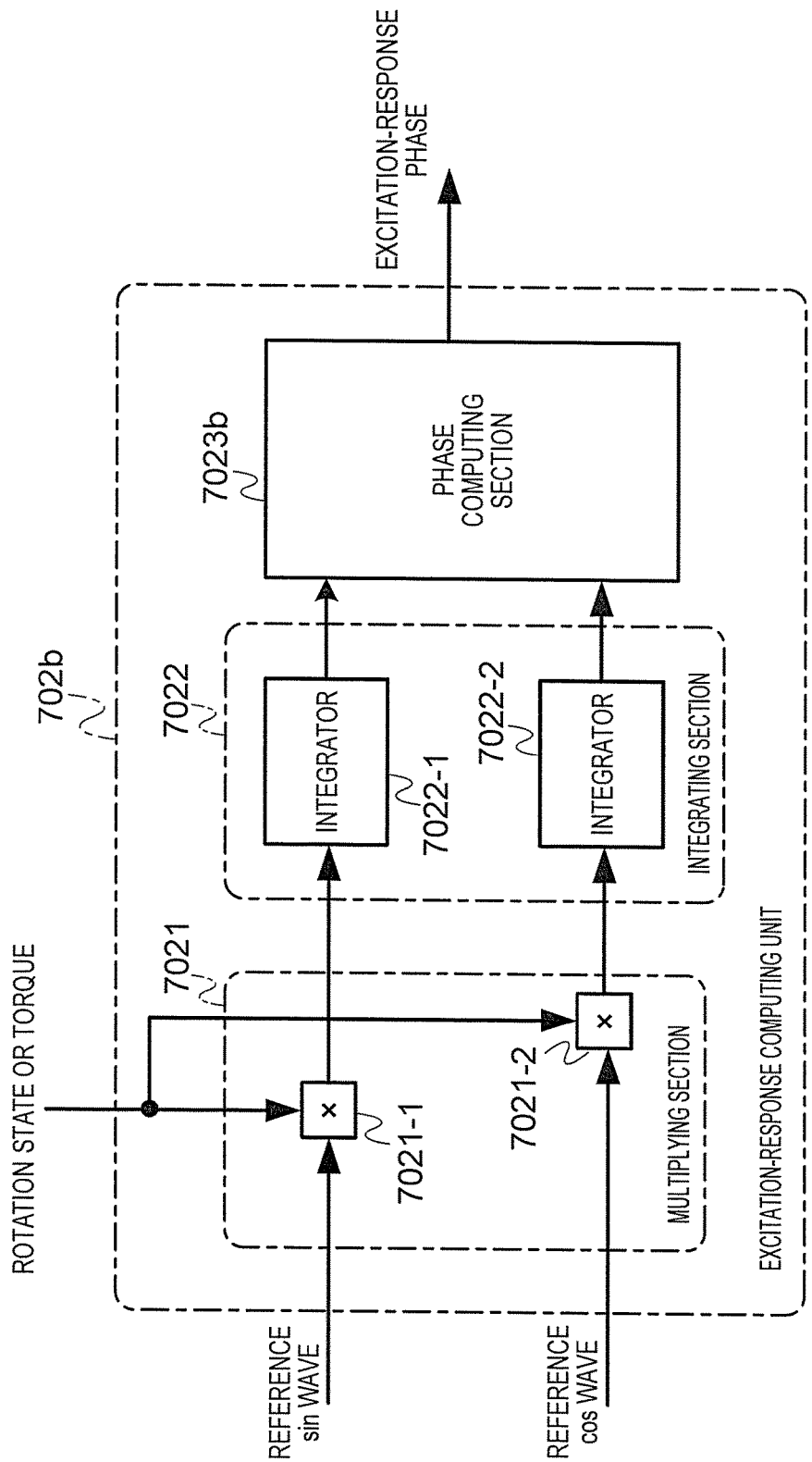
FIG. 6 is a block diagram for illustrating an example of a configuration of an excitation-response computing unit according to a second embodiment of the present invention.

FIG. 6 is a block diagram for illustrating an example of a configuration of an excitation-response computing unit according to a second embodiment of the present invention. In the first embodiment described above, the abnormality determining unit 7 computes the amplitude of the response of each of the detecting units to the excitation command. This embodiment differs from the first embodiment in that a phase of the response is computed. The remaining part is basically the same as the embodiment described above.

The abnormality determining unit 7 (see FIG. 2) of this embodiment includes an excitation-response computing unit 702b having a structure illustrated in FIG. 6 as the excitation-response computing unit 702. The excitation-response computing unit 702b computes a phase of the responses of the detecting units 3 and 4 to the excitation command for the outputs of the integrating section 7022 in a phase computing section 7023*b*. As described above, the integrated signals output from the integrating section 7022 are amplitude values of the responses at the excitation frequency in the phases respectively corresponding to the reference sin wave and the reference cos wave. The phase computing section 7023*b* computes an arc tangent for the integrated two signals that are orthogonal to each other to calculate a phase of the response of the converted rotational position θt or the output torque Ts to the excitation command, that is, an excitation-response phase. The phase has a difference of the phase from that of the reference waves as a value.

In the phase of the response of the rotational position θm or the output torque Ts to the excitation command, a predetermined phase difference may be generated while the response is made. In this case, the phase computing section 7023*b* only needs to subtract the predetermined phase difference from any one of the response phases to correct the excitation-response phase. When the determination is made using the phase as in the case of this embodiment, the amplitudes are not compared. Therefore, the dimension converting section 704 illustrated in FIG. 2 is not required to be used.

According to the configuration of this embodiment, the abnormality is detected based on the phases of the responses of the rotational position θm and the output torque Ts to the excitation command, which corresponds to a variation in which the phases are calculated from the amplitude values of the responses at the excitation frequency in the phases respectively corresponding to the reference sin wave and the reference cos wave as in the case of the first embodiment. Therefore, the basic effects can be similarly obtained.

Further, the excitation-command generating unit 5 uses the frequency of the excitation command as the excitation information. The abnormality determining unit 7 computes the phases of the response of the rotation state and the response of the output torque to the excitation command based on the frequency of the excitation command to determine the abnormality based on the phases. In this manner, the responses of the detecting units to the excitation command at the frequency of the excitation command are analyzed to enable the extraction of only the phases at the frequency. Therefore, unnecessary components can be excluded to enable the extraction of the responses with high accuracy. Therefore, the abnormality detection accuracy can be enhanced.

Third Embodiment

Figure 7:
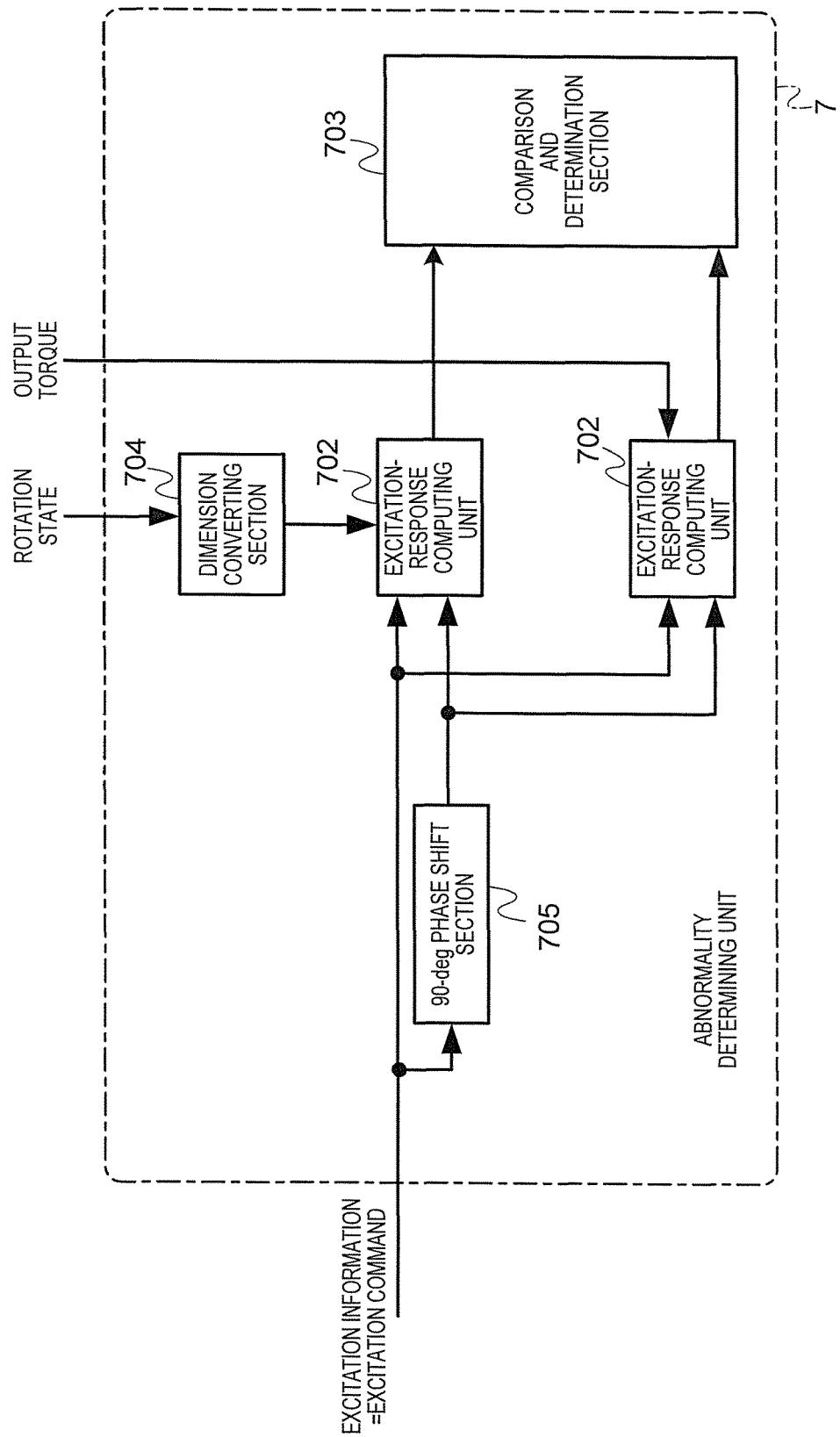
FIG. 7 is a block diagram for illustrating an example of a configuration of an abnormality determining unit according to a third embodiment of the present invention.

FIG. 7 is a block diagram for illustrating an example of a configuration of an abnormality determining unit according to a third embodiment of the present invention. In the first embodiment described above, the abnormality determining unit 7 generates the reference waves in the reference-wave generating section 701 illustrated in FIG. 2 based on the excitation frequency. In this embodiment, a method of generating the reference wave is different. As illustrated in FIG. 7, a difference from the first embodiment described above lies in that the excitation command itself is used as the excitation information, and the excitation command itself and a signal obtained by shifting the phase of the excitation command by 90 degrees are used as the reference waves. The remaining part is basically the same.

More specifically, the excitation command itself is used as the reference sin wave. In a 90-degree (deg) phase shift section 705, a signal obtained by shifting the phase of the excitation command by 90 degrees is obtained as the reference cos wave. Processing carried out in the abnormality determining unit 7 other than the generation of the reference waves is the same as that of the first embodiment.

According to the configuration of this embodiment, although the generation of the reference waves is different from that of the first embodiment, the frequency of the reference waves is perfectly the same. Therefore, the relative comparison between the excitation responses can be carried out in completely the same manner, and the same effects as those of the first embodiment are obtained.

The excitation command contains the sine wave, the excitation information is the excitation command, and the abnormality determining unit 7 determines the abnormality based on the excitation command. Therefore, the responses of the detecting units 3 and 4 to the excitation command can be extracted exclusively at the frequency of the excitation command. Therefore, the responses can be extracted with high accuracy. Thus, the abnormality detection accuracy can be enhanced. The excitation-response computing unit 702 may be any of the excitation-response computing unit 702*a* configured to perform the amplitude computation illustrated in FIG. 4 and the excitation-response computing unit 702*b* configured to perform the phase computation illustrated in FIG. 6 (the same applies to the following).

Fourth Embodiment

Figure 8:
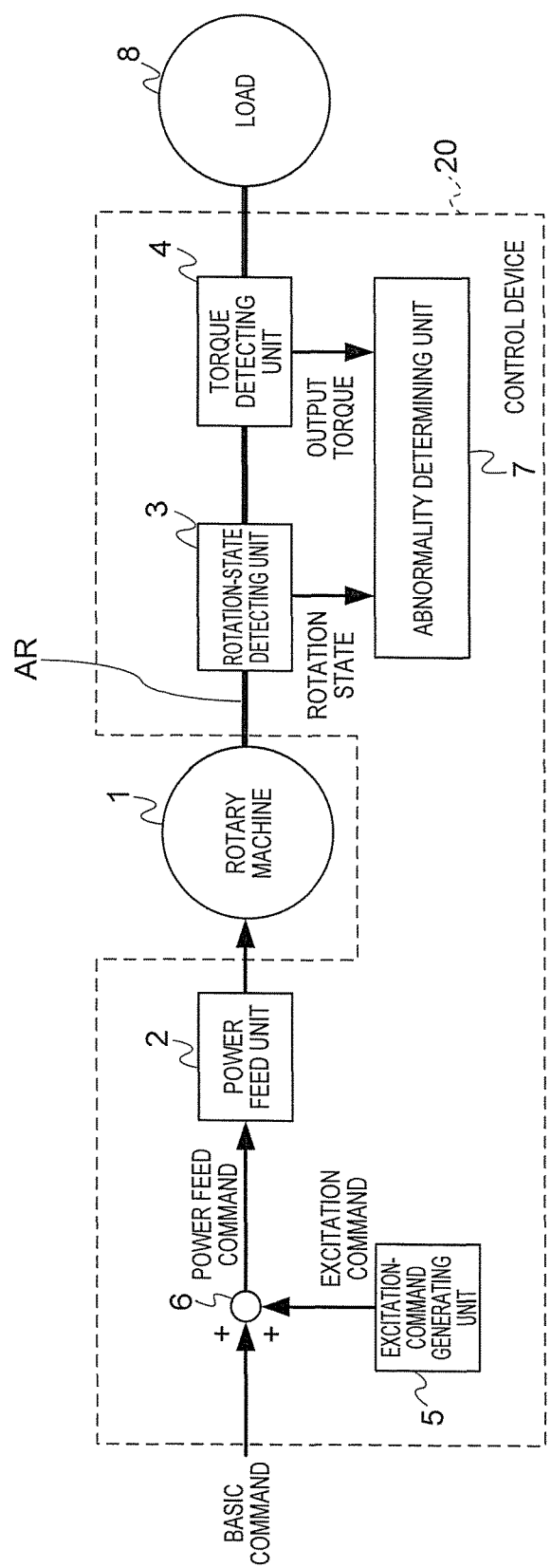
FIG. 8 is a diagram for illustrating a configuration of a control device for a rotary machine according to a fourth embodiment of the present invention and a periphery thereof.

FIG. 8 is a diagram for illustrating a configuration of a control device for a rotary machine according to a fourth embodiment of the present invention and a periphery thereof. In the first embodiment described above, the abnormality determining unit 7 computes the excitation-response amplitude based on the excitation information that is the feature quantity of the excitation command to determine the abnormality. This embodiment differs from the first embodiment in that the abnormality determining unit 7 computes the excitation responses without receiving the excitation information from the excitation-command generating unit 5 as illustrated in FIG. 8. The remaining part is the basically the same.

Figure 9:
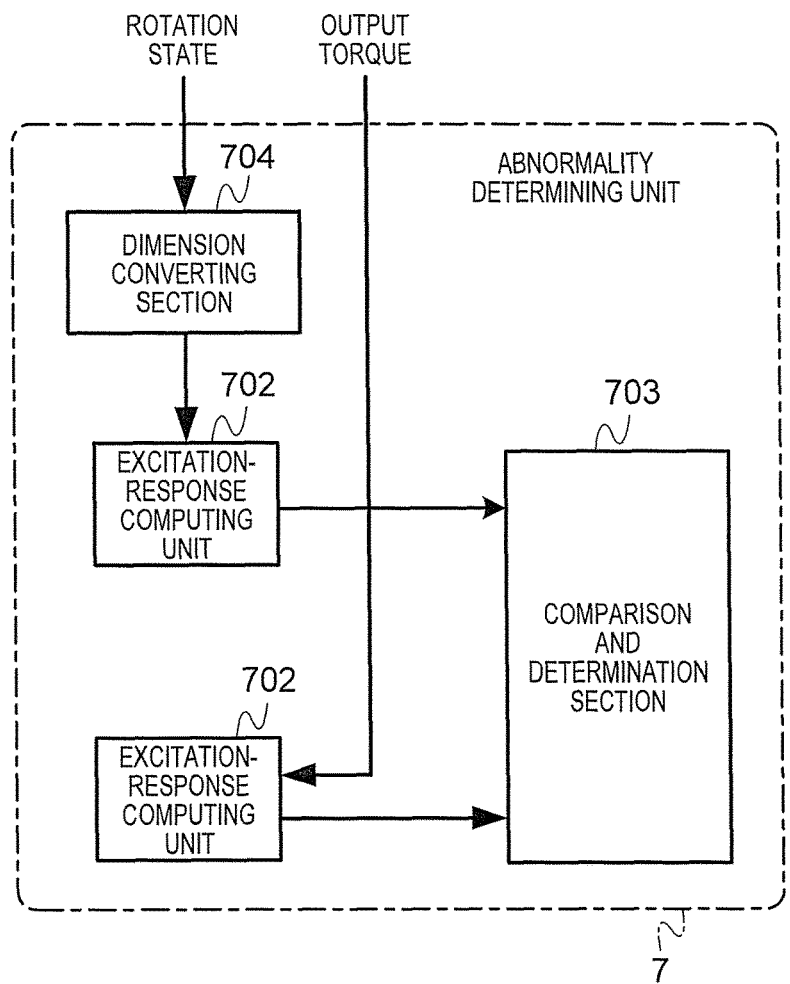
FIG. 9 is a block diagram for illustrating an example of a configuration of an abnormality determining unit according to the fourth embodiment of the present invention.

FIG. 9 is a block diagram for illustrating an example of a configuration of the abnormality determining unit according to the fourth embodiment of the present invention. The abnormality determining unit 7 is configured as illustrated in FIG. 9, and computes the excitation-response amplitudes without inputting the reference waves to the excitation-response computing units 702.

Figure 10:
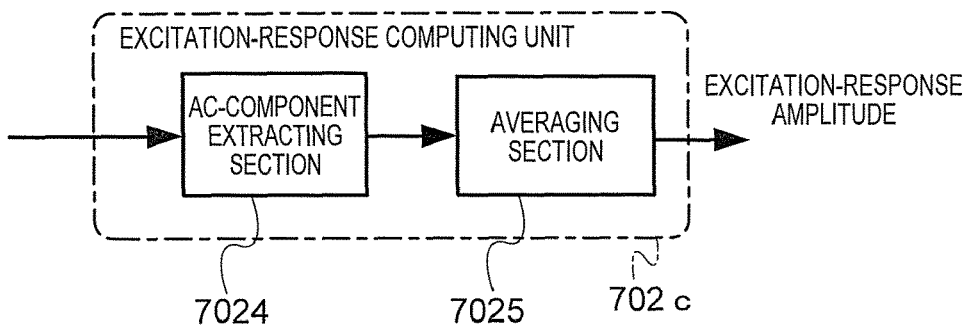
FIG. 10 is a block diagram for illustrating an example of a configuration of a power feed unit according to the fourth embodiment of the present invention.

FIG. 10 is a block diagram for illustrating an example of the configuration of the excitation-response computing unit according to the fourth embodiment of the present invention. The excitation-response computing unit 702 includes, specifically, as in an excitation-response computing unit 702*c* illustrated in FIG. 10, an AC-component extracting section 7024 and an averaging section 7025. The AC-component extracting section 7024 is formed from, for example, a high-pass filter, and extracts an oscillation component, that is, an AC component of the rotary machine 1 configured to oscillate in response to the excitation command. The AC-component extracting section 7024 extracts an AC component of the converted rotational position θt or the output torque Ts through the high-pass filter and outputs AC-component signals respectively corresponding thereto. The averaging section 7025 obtains absolutes values of the AC-component signals and averages the absolutes values by using a moving average or the like to calculate a value corresponding to an effective value of the amplitude of the AC component as the excitation-response amplitude.

In the manner described above, although the AC component other than the excitation frequency is also contained in the excitation-response amplitude as an error, the effects thereof can be sufficiently reduced by setting the excitation amplitude Ae large with respect to the error. Therefore, the same effects as those of the first embodiment can be obtained.

Further, the abnormality determining unit 7 extracts the AC components from the response of the rotation state and the response of the output torque to the excitation command and determines the abnormality based on the AC components. Therefore, with the simple configuration without using the excitation information, the same effects as those of the first embodiment can be obtained, the detection accuracy can be enhanced, and the abnormality detectable operating state can be extended to the wide range. Thus, remarkable effects that cannot be obtained hitherto are produced.

Fifth Embodiment

In the first embodiment described above, the abnormality determining unit 7 computes the excitation-response amplitudes based on the excitation information that is the feature quantity of the excitation command to determine the abnormality. This embodiment differs from the first embodiment, similarly to the fourth embodiment, in that the abnormality determining unit 7 computes the excitation responses without receiving the excitation information from the excitation-command generating unit as illustrated in FIG. 8. The remaining part is basically the same.

Figure 11:
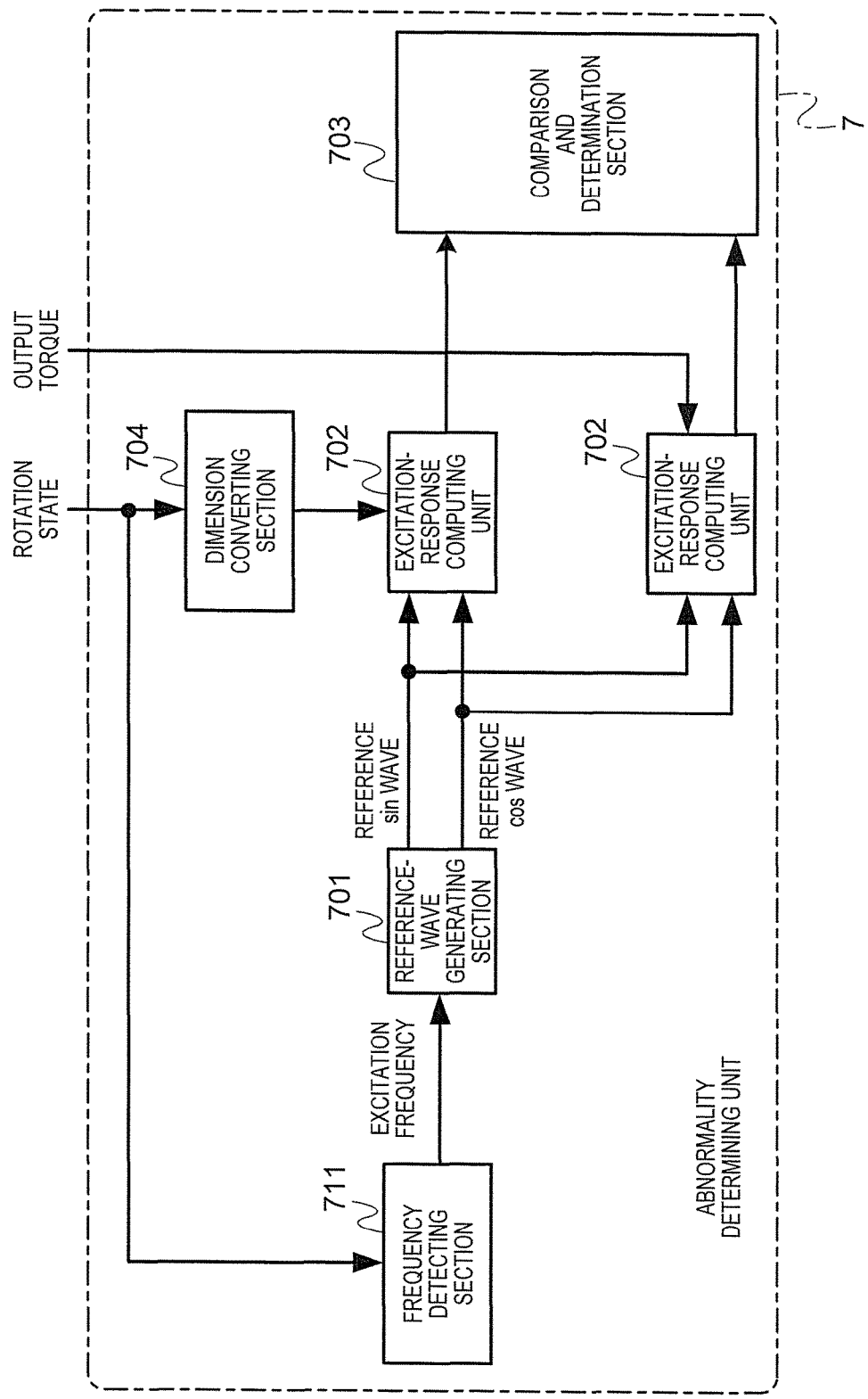
FIG. 11 is a block diagram for illustrating an example of a configuration of an abnormality determining unit according to a fifth embodiment of the present invention.

FIG. 11 is a block diagram for illustrating an example of a configuration of the abnormality determining unit according to the fifth embodiment of the present invention. The abnormality determining unit 7 is configured as illustrated in FIG. 11. The excitation frequency is calculated (detected) by a frequency detecting section 711, and the reference-wave generating section 701 computes the reference wave based on the excitation frequency.

First, the excitation amplitude Ae generated in the excitation-command generating unit 5 is set larger than the oscillation components other than the excitation command in advance.

The frequency detecting section 711 uses a value of the rotational position θm in a predetermined time period to analyze a frequency by a spectral analysis, which is a generally known method. As a result of the frequency analysis, the amplitude at each of the frequencies is computed. Among various oscillations, the oscillation generated in response to the excitation command is dominant. Therefore, the excitation frequency is specified as the largest value. In this manner, the reference-wave generating section 701 computes the reference waves based on the excitation frequency ωe calculated in the frequency detecting section 711.

In addition to the use of the spectral analysis, the frequency detecting section 711 can also perform the frequency analysis by extracting the AC component of the rotational position θm and counting one period of the AC component based on a positive/negative sign or the like. A value obtained by dividing a count number within the predetermined time period by the predetermined time period can be specified as the excitation frequency.

Further, the frequency detecting section 711 performs the frequency analysis based on the value of the rotational position θm. Besides, the frequency analysis may be performed based on the value of the output torque Ts. The frequency of the oscillation to the excitation appears similarly, and therefore the same actions can be obtained.

By the configuration as in this embodiment, the oscillation components at a frequency other than the excitation frequency appear as an error in the frequency analysis. However, the effects thereof can be sufficiently reduced by setting the excitation amplitude Ae large with respect to the amplitude. Therefore, the same effects as those of the first embodiment can be obtained without using the oscillation information in the abnormality determining unit 7.

Further, the abnormality determining unit 7 determines the abnormality based on the amplitudes of the response of the rotation state and the response of the output torque to the excitation command. In this manner, the abnormality can be determined based only on the amplitudes, excluding other information such as the phase from the components of the responses of the detecting units 3 and 4 to the excitation command. Therefore, the determination can be made in a simple manner in the simple determining unit.

Sixth Embodiment

Figure 12:
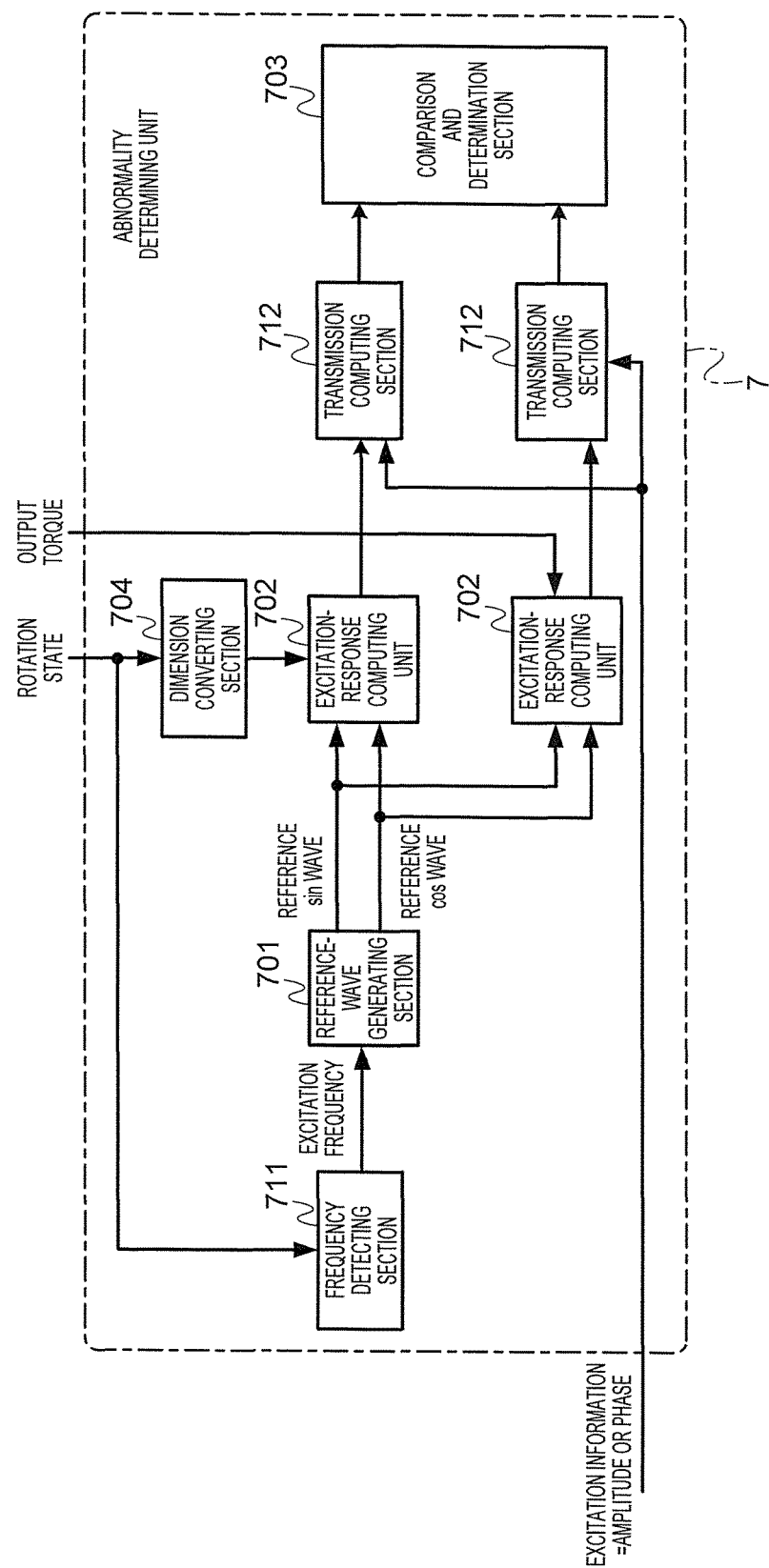
FIG. 12 is a block diagram for illustrating an example of a configuration of an abnormality determining unit according to a sixth embodiment of the present invention.

FIG. 12 is a block diagram for illustrating an example of the configuration of the abnormality determining unit according to a sixth embodiment of the present invention. In the fifth embodiment described above, the abnormality determining unit 7 computes the excitation-response amplitudes in the excitation-response computing units 702 to determine the abnormality. In this embodiment, the abnormality determining unit 7 computes transmission gains or transmission phases that are feature quantities of transmission from the excitation command to the excitation responses in transmission computing sections 712 based on the excitation-response amplitudes as illustrated in FIG. 12. Differences lie in that the comparison and determination unit section 703 determines the abnormality based on the transmission gains or the transmission phases and the transmission computing sections 712 receive the excitation information (amplitude or phase) from, for example, the excitation-command generating unit 5 illustrated in FIG. 1. The remaining part is basically the same.

Similarly to the fifth embodiment, the excitation-response amplitudes computed in the excitation-response computing units 702 are divided by the excitation amplitude Ae that is the excitation information in the transmission computing sections 712, thereby computing transmission gains from the excitation command to the responses of the converted rotational position θt and the output torque Ts.

Based on those transmission gains, the comparison and determination section 703 compares the transmission gain of the converted rotational position θt and the transmission gain of the output torque Ts with each other, determines whether a difference therebetween exceeds a predetermined value that is determined within a normal error range, and determines the occurrence of the abnormality in the rotation-state detecting unit 3 or the torque detecting unit 4 when a time period in which the difference exceeds the predetermined value becomes a predetermined time period or longer.

In the description given above, the transmission gains are computed. The excitation-response phases may also be computed in the excitation-response computing units 702 as in the second embodiment, and the excitation phase (De is subtracted from the excitation-response phases to obtain the transmission phases in the transmission computing sections 712 so that the abnormality is determined based on a difference between the transmission phases from the excitation command to the responses of the converted rotational position θt and the output torque Ts.

By the configuration as in this embodiment, the transmission gains and the transmission phases can be treated as values merely proportional to or offset from the excitation-response amplitudes and the excitation-response phases, respectively. Therefore, the same effects as those of the fifth embodiment can be obtained.

Further, the excitation command contains the sine wave, the excitation information is the phase or the amplitude of the excitation command, and the abnormality determining unit 7 computes the transmission gains or the transmission phases based on the phase or the amplitude of the excitation command to determine the abnormality. The transmission from the excitation command to the responses does not depend on the amplitude or the phase of the excitation, and therefore does not depend on a design value of the excitation amplitude or the excitation phase of the excitation command. Thus, the threshold value in the comparison and determination section 703 can be fixed to a constant value, and hence designing is facilitated.

The reference-wave generating section 701 illustrated in FIG. 2 may be provided to generate the reference waves based on the excitation frequency as in the first embodiment without using the frequency detecting section 711. The same effects are obtained regardless of a method of generating the reference waves.

Seventh Embodiment

Figure 13:
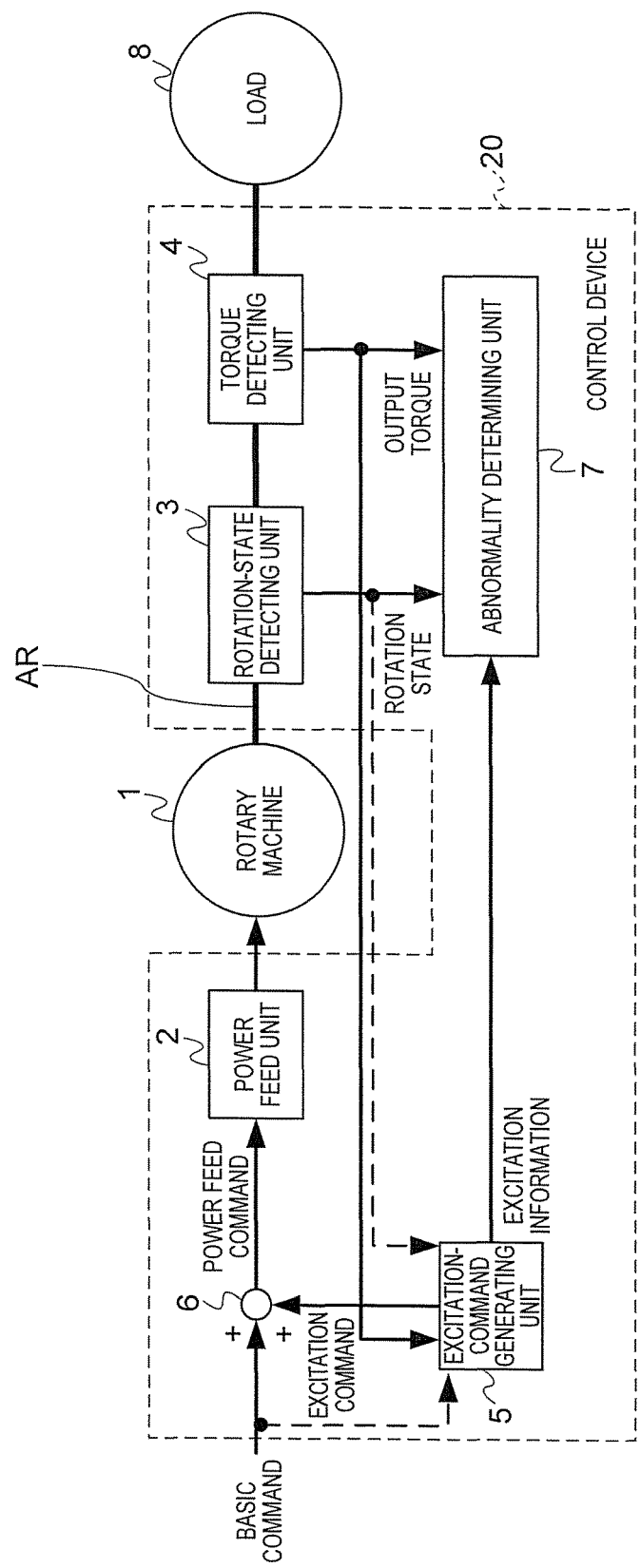
FIG. 13 is a diagram for illustrating a configuration of a control device for a rotary machine according to a seventh embodiment of the present invention and a periphery thereof.

FIG. 13 is a diagram for illustrating a configuration of a control device for a rotary machine according to a seventh embodiment of the present invention and a periphery thereof. In the first embodiment described above, the amplitude of the excitation command is fixed in the excitation-command generating unit 5. This embodiment differs from the first embodiment in that the amplitude of the excitation command, that is, the excitation amplitude Ae is varied based on the state variable of the control device. The remaining part is basically the same.

Examples thereof include the configuration illustrated in FIG. 13. The output torque Ts is input to the excitation-command generating unit 5. The excitation-command generating unit 5 adds a value proportional to a magnitude of the output torque Ts to a predefined fixed value to compute the excitation amplitude Ae.

By the configuration described above, the excitation amplitude Ae can be set larger as the friction torque increases so as to correspond to a magnitude of the friction torque on the rotary shaft AR, which varies depending on the load state. The magnitude of the friction torque of the rotary shaft AR sometimes has a tendency of being approximately proportional to a magnitude of the output torque or the torque generated by the rotary machine 1. Therefore, by performing a correction proportional to the output torque, the property described above is obtained. Further, as indicated by the broken line in FIG. 13, in place of the output torque, the excitation amplitude may be variable based on the basic command. The output state and the load state change in accordance with the basic command, and therefore the same actions are obtained. Further, the rotation state θm also changes in accordance with the basic command. Therefore, the excitation amplitude may be variable in proportion to the rotation state θm.

The excitation-command generating unit 5 is configured to change the amplitude of the excitation command in accordance with any one of the rotation state, the output torque, and the basic command. Therefore, a state in which the excitation response is reduced under the effects of the friction torque to make the detection of the abnormality difficult is less liable to be brought about. Therefore, the abnormality detection accuracy is enhanced.

Although the excitation amplitude Ae is variable in accordance with the output torque Ts or the rotation state θm in the above-mentioned configuration, the excitation amplitude may be changed based on any one of the excitation-response amplitudes. For example, a feedback may be configured so that the excitation-response amplitude is subtracted from a target value of the excitation-response amplitude and a value obtained by multiplying the result by a gain is obtained as the excitation amplitude. In this manner, the excitation-response amplitude can be made to follow the target value of the excitation-response amplitude. Even if the friction torque varies, the excitation-response amplitude can be kept within a range in which the excitation-response amplitude is neither too small nor too large. Thus, the abnormality detection accuracy can be enhanced, while the discomfort can be reduced without causing oscillation of an excessive magnitude.

Eighth Embodiment

Figure 14:
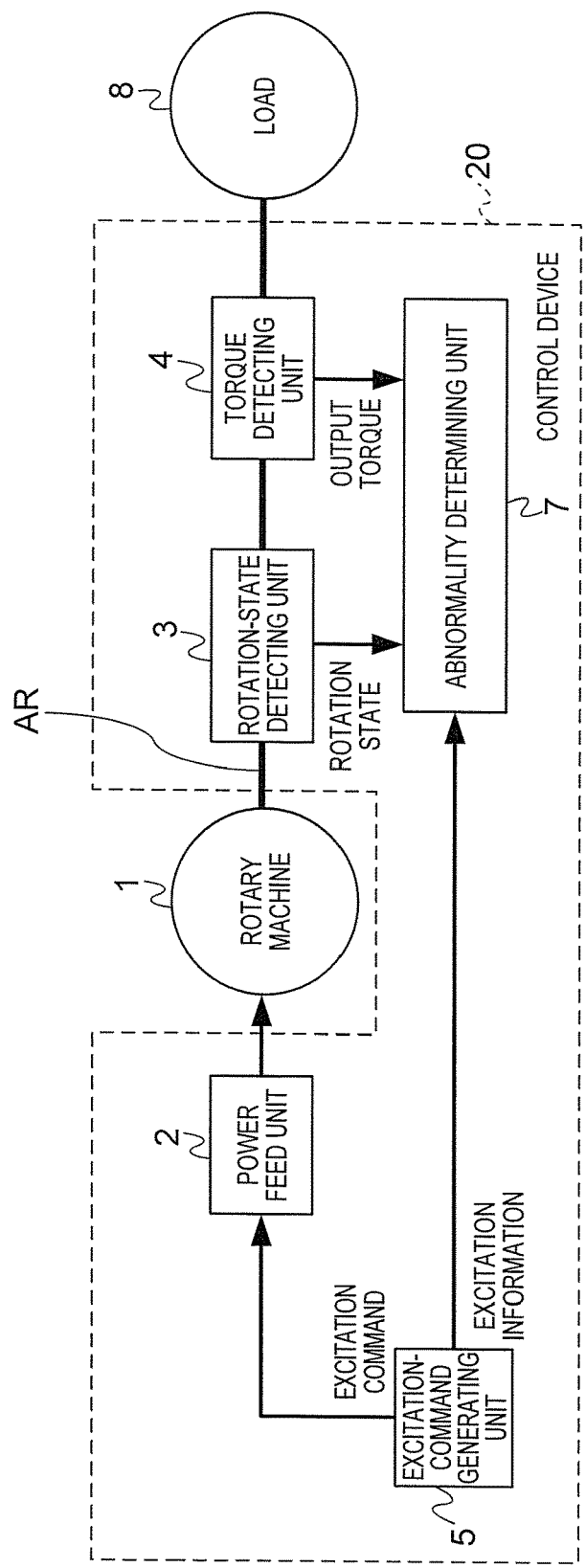
FIG. 14 is a diagram for illustrating a configuration of a control device for a rotary machine according to an eighth embodiment of the present invention and a periphery thereof.

FIG. 14 is a diagram for illustrating a configuration of a control device for a rotary machine according to an eighth embodiment of the present invention and a periphery thereof. In the first embodiment described above, the excitation command is added to the basic command to compute the power feed command. This embodiment differs from the first embodiment in that the excitation-command generating unit 5 outputs the excitation command to the power feed unit 2 as the power feed command as illustrated in FIG. 14. The remaining part is basically the same.

This is an illustration of a state before or after the generation of the basic command to allow the rotary machine 1 to make the basic rotation. In absence of a basic operation, the rotary machine 1 is oscillated by the excitation command to detect the abnormality.

In this manner, safety can be verified before the basic operation. In case of abnormality, the basic operation can be cancelled.

Ninth Embodiment

Although the rotation state detected by the rotation-state detecting unit 3 is the rotational position θm of the rotary machine 1 in the first embodiment described above, the rotation state detected by the rotation-state detecting unit 3 is a rotation speed of the rotary machine 1 in this embodiment. A difference from the first embodiment lies in that the dimension converting section 704 illustrated in FIG. 2 converts and computes the rotating speed into the rotational position and then multiplies the rotational position by a gain to obtain the converted rotational position θt. The remaining part is basically the same.

For the conversion of the rotating speed into the rotational position, an integrator only needs to be used. The dimension converting section 704 includes an integrator. A response that is desired to be obtained as the excitation response is the AC component. Therefore, an integration characteristic is not required at all the frequencies. For example, by using a low-pass filter, the integration characteristic may be obtained at a frequency equal to or higher than a crossover frequency. Specifically, filter processing including the integration only needs to be performed. It can be said that this is equivalent to conversion or estimation (computation) from the rotation speed to the rotational position.

Although the rotation-state detecting unit 3 detects the rotation state in the above-mentioned configuration, the rotation speed may be estimated based on an induced voltage as is well-known, without being directly detected. The same actions as those of the first embodiment can be realized even with this configuration.

The rotation-state detecting unit 3 detects or estimates (computes) the rotation speed or estimates (computes) the rotational position instead of detecting the rotational position of the rotary machine 1. Therefore, even in a control device including various detecting units configured to detect the rotation state without being limited to the detecting unit configured to detect the rotational position of the rotary machine 1, the abnormality can be detected as in the first embodiment. Further, by estimating the rotation state, hardware cost can be reduced.

In the above-mentioned configuration, the filter processing including the integration is performed on the rotation speed so as to be compared with the response of the output torque. However, for example, the dimension converting section 704 illustrated in FIG. 2 may be provided on the torque detecting unit 4 side (not shown) instead of the rotation-state detecting unit 3 side so that the rotation speed is directly used as the speed to differentiate the output torque instead in the dimension converting unit to match the dimensions. When the dimensions are matched in the above-mentioned manner, the same effects as those of the first embodiment are obtained. For the differentiation, a filter for removing high-frequency noise is used. Therefore, a filter configuration generally includes the integration.

The rotation state is the rotation speed. The abnormality determining unit 7 determines the abnormality based on the value obtained by performing the filter processing including the integration on the response of the rotating speed or the response of the output torque to the excitation command. Therefore, even when the dimensions of the state variables detected respectively by the detecting units 3 and 4 are different and therefore the dynamic conversion including the phases is required, the conversion into the same dimension can be successively performed. Thus, each of the detecting units 3 and 4 is not required to include two systems, and the same effects as those of the first embodiment are obtained. Hence, the detection accuracy can be enhanced, and the abnormality detectable operating state can be extended to the wide range. Thus, remarkably effects that cannot be obtained hitherto are produced.

Tenth Embodiment

Figure 15:
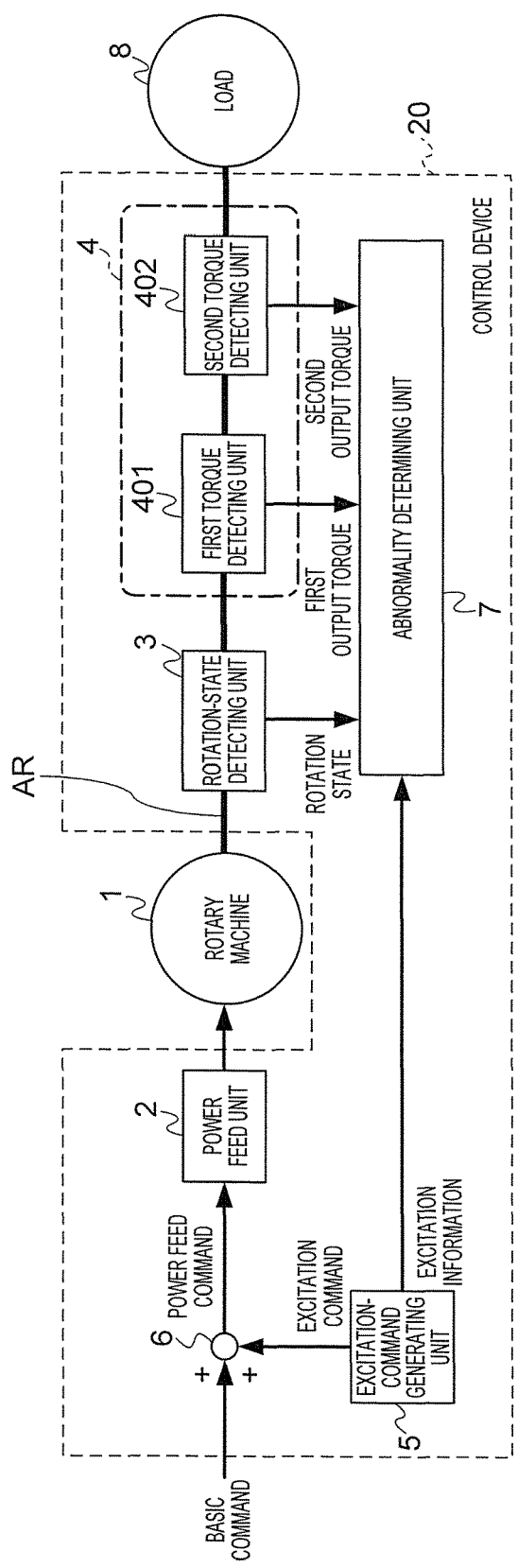
FIG. 15 is a diagram for illustrating a configuration of a control device for a rotary machine according to a tenth embodiment of the present invention and a periphery thereof.

FIG. 15 is a diagram for illustrating a configuration of a control device for a rotary machine according to a tenth embodiment of the present invention and a periphery thereof. In the first embodiment described above, only one system of the torque detecting unit 4 is provided. In this embodiment, as illustrated in FIG. 15, the torque detecting unit includes two systems corresponding to a first torque detecting unit 401 and a second torque detecting unit 402. A difference from the first embodiment lies in that the detecting units 401 and 402 respectively output a first output torque and a second output torque and the abnormality determining unit 7 detects the abnormality based on both the first output torque and the second output torque. The remaining part is basically the same.

Figure 17:
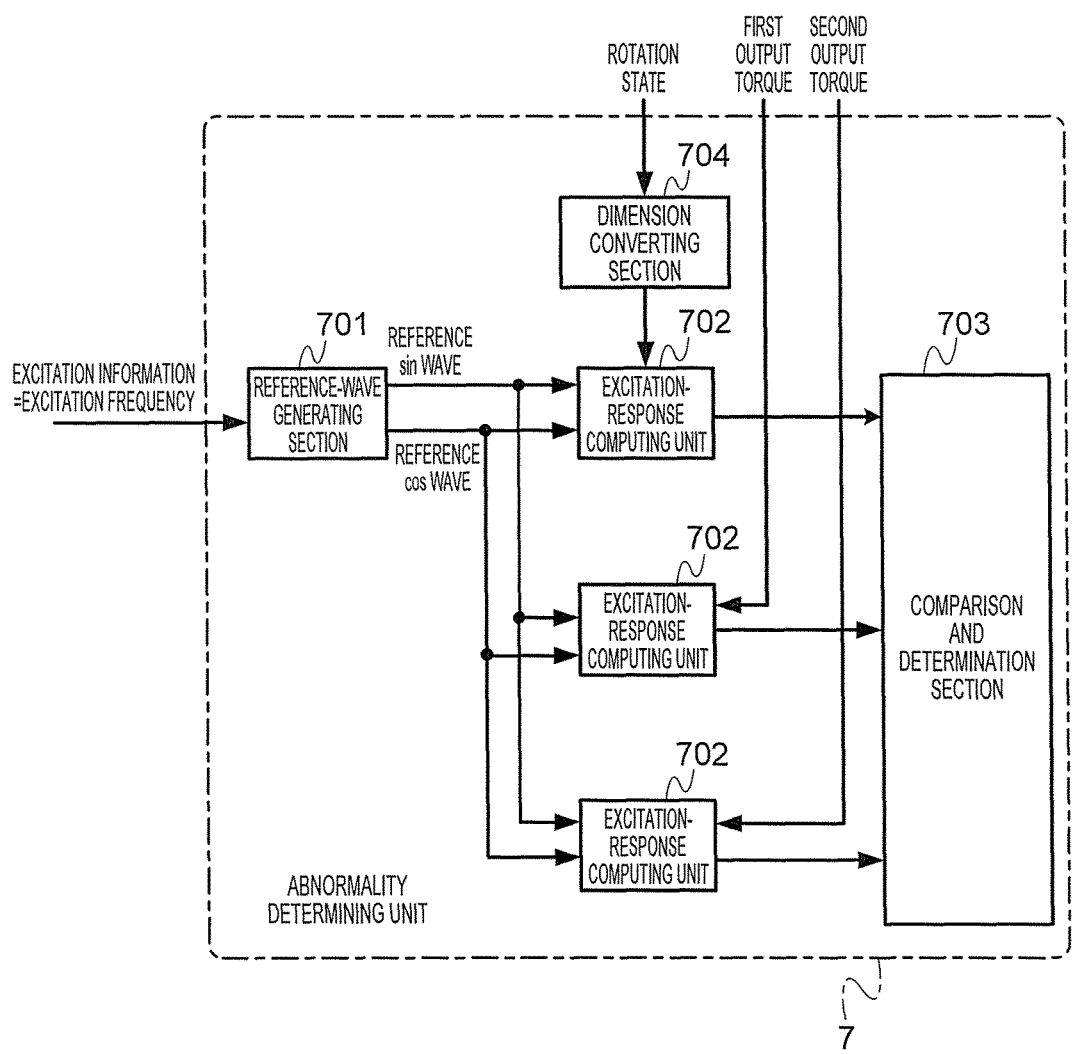
FIG. 17 is a block diagram for illustrating an example of a configuration of an abnormality determining unit according to the tenth embodiment of the present invention.

FIG. 17 is a block diagram for illustrating an example of a configuration of the abnormality determining unit according to the tenth embodiment of the present invention. As illustrated in FIG. 17, the abnormality determining unit 7 includes three excitation-response computing units 702 configured to compute three excitation-response amplitudes in total respectively for the rotational position corresponding to the rotation state, the first output torque, and the second output torque.

The comparison and determination section 703 mutually compares the three excitation-response amplitudes of the converted rotational position θt, the first output torque, and the second output torque and determines whether or not each of differences exceeds a predetermined value determined within a normal error range. When a time period in which any two of the three have errors equal to or smaller than the predetermined value and the other one has an error exceeding the predetermined value as compared with the two becomes a predetermined time period or longer, it is determined that the abnormality occurs in the rotation-state detecting unit 3, the first torque detecting unit 401, or the second torque detecting unit 402, which corresponds to the one excitation-response amplitude. Specifically, the abnormal one of the three detecting units is specified.

The torque detecting unit includes two systems corresponding to the first torque detecting unit 401 and the second torque detecting unit 402 configured to respectively output the first output torque and the second output torque. When any two responses of the response of the rotation state, the response of the first output torque, and the response of the second output torque to the excitation command are equal to each other and the other one response is different, the abnormality determining unit 7 determines the occurrence of the abnormality in any one of the rotation state, the first output torque, and the second output torque, which exhibits the different response. In this manner, in addition to the effects produced by the first embodiment, a remarkable effect of enabling approximately constant specification of the abnormal detecting unit, which is not obtained hitherto, can be obtained only by providing two systems for one of the detecting units configured to detect two different state variables of the rotary machine 1 without providing three systems for each of the detecting units.

Eleventh Embodiment

Figure 16:
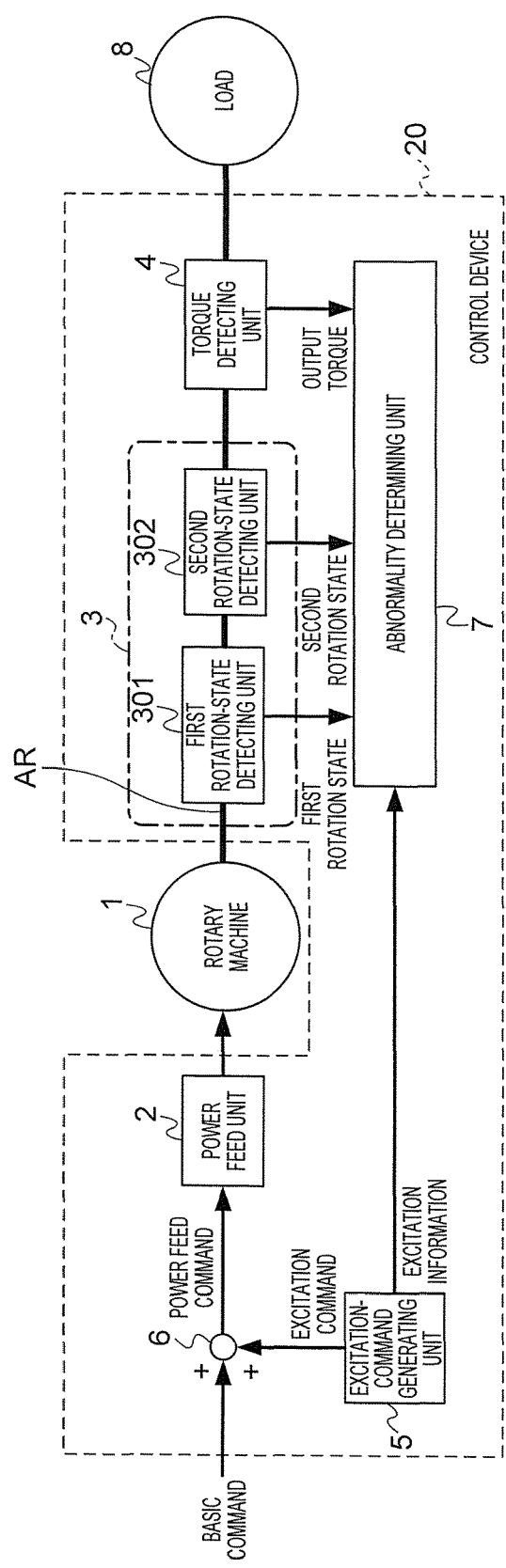
FIG. 16 is a diagram for illustrating a configuration of a control device for a rotary machine according to an eleventh embodiment of the present invention and a periphery thereof.

FIG. 16 is a diagram for illustrating a configuration of a control device for a rotary machine according to an eleventh embodiment of the present invention and a periphery thereof. In the first embodiment described above, only one system of the rotation-state detecting unit 3 is provided. In this embodiment, as illustrated in FIG. 16, the rotation-state detecting unit includes two systems corresponding to a first rotation-state detecting unit 301 and a second rotation-state detecting unit 302. The eleventh embodiment differs from the first embodiment in that the detecting units 301 and 302 respectively output a first rotation state and a second rotation state and the abnormality determining unit 7 detects the abnormality based on both the first rotation state and the second rotation state. The remaining part is basically the same. Even in this embodiment, the rotation state is the rotational position.

Figure 18:
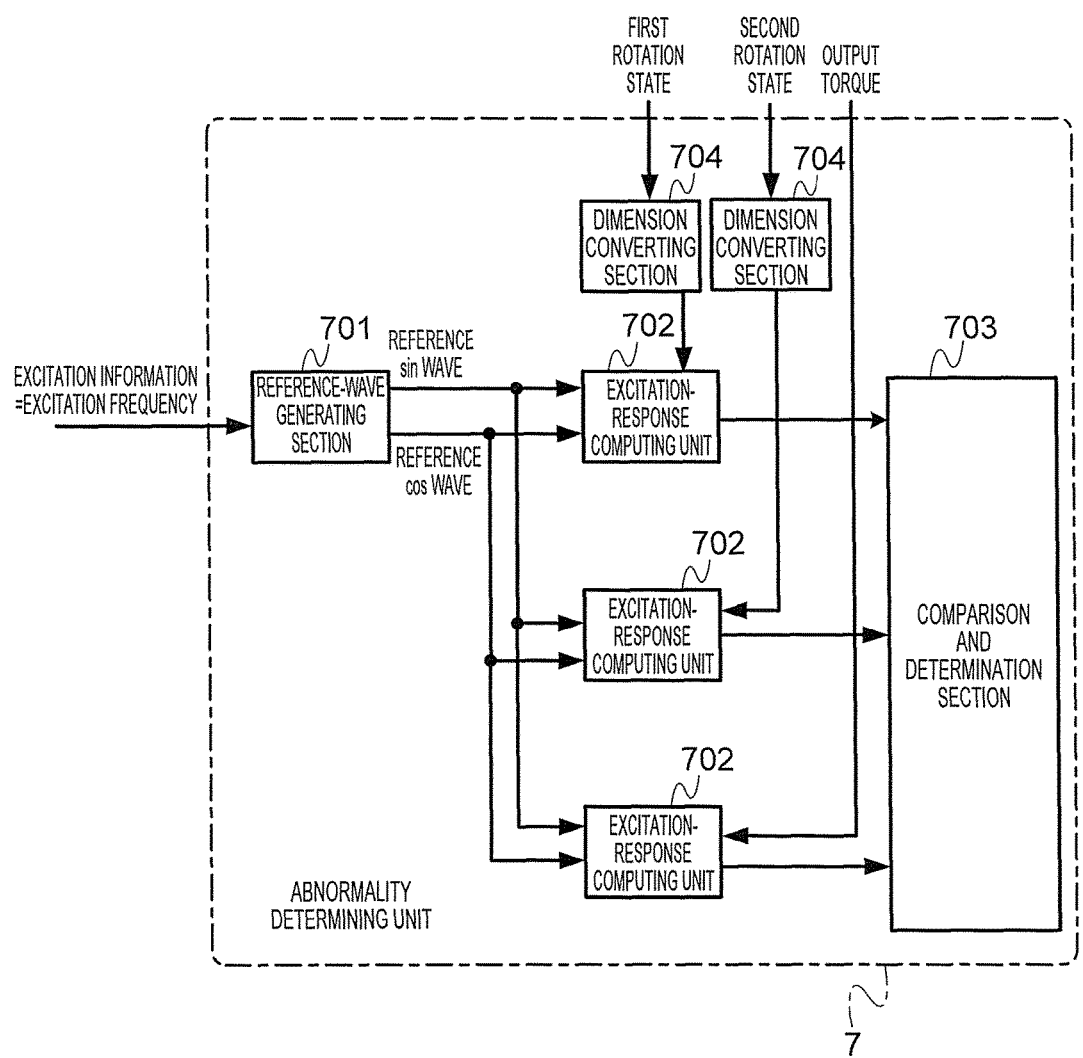
FIG. 18 is a block diagram for illustrating an example of a configuration of an abnormality determining unit according to the eleventh embodiment of the present invention.

FIG. 18 is a block diagram for illustrating an example of a configuration of the abnormality determining unit according to the eleventh embodiment of the present invention. As illustrated in FIG. 18, the abnormality determining unit 7 includes two dimension converting sections 704 configured to respectively convert the first rotational position and the second rotational position into a first converted rotational position and a second converted rotational position as in the first embodiment.

The abnormality determining unit 7 includes three excitation-response computing units 702 configured to compute three excitation-response amplitudes in total respectively for the first converted rotational position, the second converted rotational position, and the output torque. The comparison and determination section 703 mutually compares the three excitation-response amplitudes of the first converted rotational position, the second converted rotational position, and the output torque and determines whether or not each of differences exceeds a predetermined value determined within a normal error range. When a time period in which any two of the three have errors equal to or smaller than the predetermined value and the other one has an error exceeding the predetermined value as compared with the two becomes a predetermined time period or longer, it is determined that the abnormality occurs in the first rotation-state detecting unit 301, the second rotation-state detecting unit 302, or the torque detecting unit 4, which corresponds to the one excitation-response amplitude. Specifically, the abnormal one of the three detecting units is specified.

The rotation-state detecting unit includes two systems corresponding to the first rotation-state detecting unit 301 and the second rotation-state detecting unit 302 configured to respectively output the first rotation state and the second rotation state. When any two responses of the response of the first rotation state, the response of the second rotation state, and the response of the output torque to the excitation command are equal to each other and the other one response is different, the abnormality determining unit 7 determines the occurrence of the abnormality in any one of the first rotation state, the second rotation state, and the output torque, which exhibits the different response. In this manner, in addition to the effects produced by the first embodiment, a remarkable effect of enabling approximately constant specification of the abnormal detecting unit, which is not obtained hitherto, can be obtained only by providing two systems for one of the detecting units configured to detect two different state variables of the rotary machine without providing three systems for each of the detecting units.

Twelfth Embodiment

Figure 19:
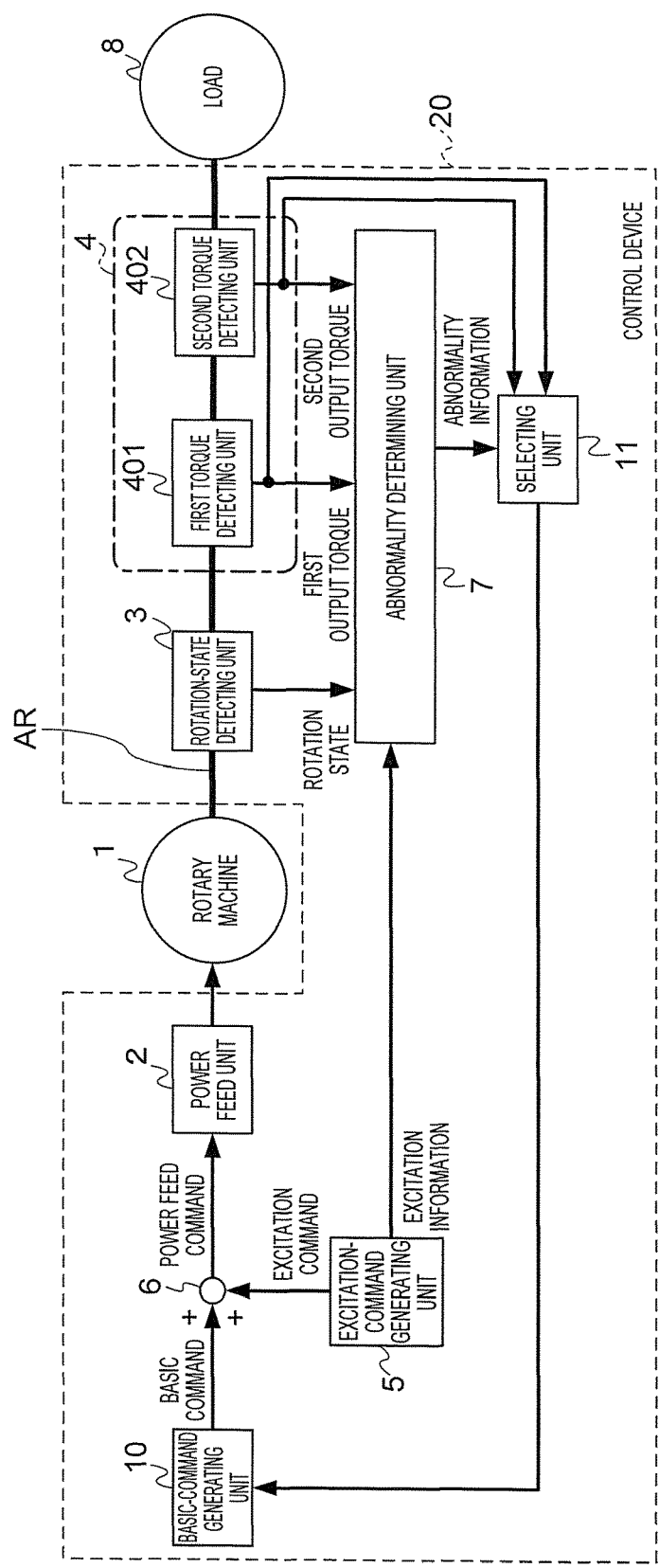
FIG. 19 is a diagram for illustrating a configuration of a control device for a rotary machine according to a twelfth embodiment of the present invention and a periphery thereof.

FIG. 19 is a diagram for illustrating a configuration of a control device for a rotary machine according to a twelfth embodiment of the present invention and a periphery thereof. In addition to the configuration described in the tenth embodiment described above, the abnormality determining unit 7 inputs, as abnormality information, which detecting unit is specified as being abnormal to a selecting unit 11 in this embodiment as illustrated in FIG. 19. When any one of the first torque detecting unit 401 and the second torque detecting unit 402 is abnormal, the selecting unit 11 selects the output torque output from the other normal one and inputs the output torque to a basic-command generating unit 10.

In a normal state without the occurrence of an abnormality, the basic-command generating unit 10 generates the basic command based on the output torque of the first torque detecting unit 401, which is output from the selecting unit 11. However, when any one of the first torque detecting unit 401 and the second torque detecting unit 402 is determined as being abnormal in the abnormality determining unit 7, the basic command is generated based on the output torque of the normal system, which is selected by the selecting unit 11 based on the abnormality information. In this manner, if one of the two systems corresponding to the torque detecting units is abnormal, the control is continued based on the other normal one.

Next, when one of the two systems corresponding to the torque detecting units 401 and 402 is abnormal, the comparison and determination section 703 (FIG. 17) compares the excitation-response amplitude of the converted rotational position θt and the excitation-response amplitude of the output torque Ts of the normal system with each other based on the excitation-response amplitudes output from the excitation-response computing units 702. Then, it is determined whether or not a difference between the excitation-response amplitudes exceeds a predetermined value that is determined within a normal error range. When a time period in which the difference exceeds the predetermined value becomes a predetermined time period or longer, it is determined that a new abnormality occurs in the rotation-state detecting unit 3 or the torque detecting unit (401 or 402) of the system that has been treated as normal. Specifically, a second secondary abnormality in the two detecting units is detected. After the detection of the secondary failure, the comparison and determination section 703 performs a procedure of stopping the control of the rotary machine 1 or the like.

The torque detecting unit includes two systems corresponding to the first torque detecting unit 401 and the second torque detecting unit 402 configured to respectively output the first output torque and the second output torque. When any one of the first output torque and the second output torque is abnormal, the control device continues the control of the rotary machine 1 based on the output torque of the normal system. The abnormality determining unit 7 determines the abnormality based on the response of the rotation state and the response of the output torque of the normal system to the excitation command. Because of the configuration described above, in addition to the effects produced by the tenth embodiment, a remarkable effect of enabling approximately constant specification of the abnormal detecting unit with high accuracy even after one of the two systems becomes abnormal, which is not obtained hitherto, can be obtained only by providing two systems for one of the detecting units configured to detect the two different state variables of the rotary machine 1 without providing three systems for each of the detecting units.

Thirteenth Embodiment

Figure 20:
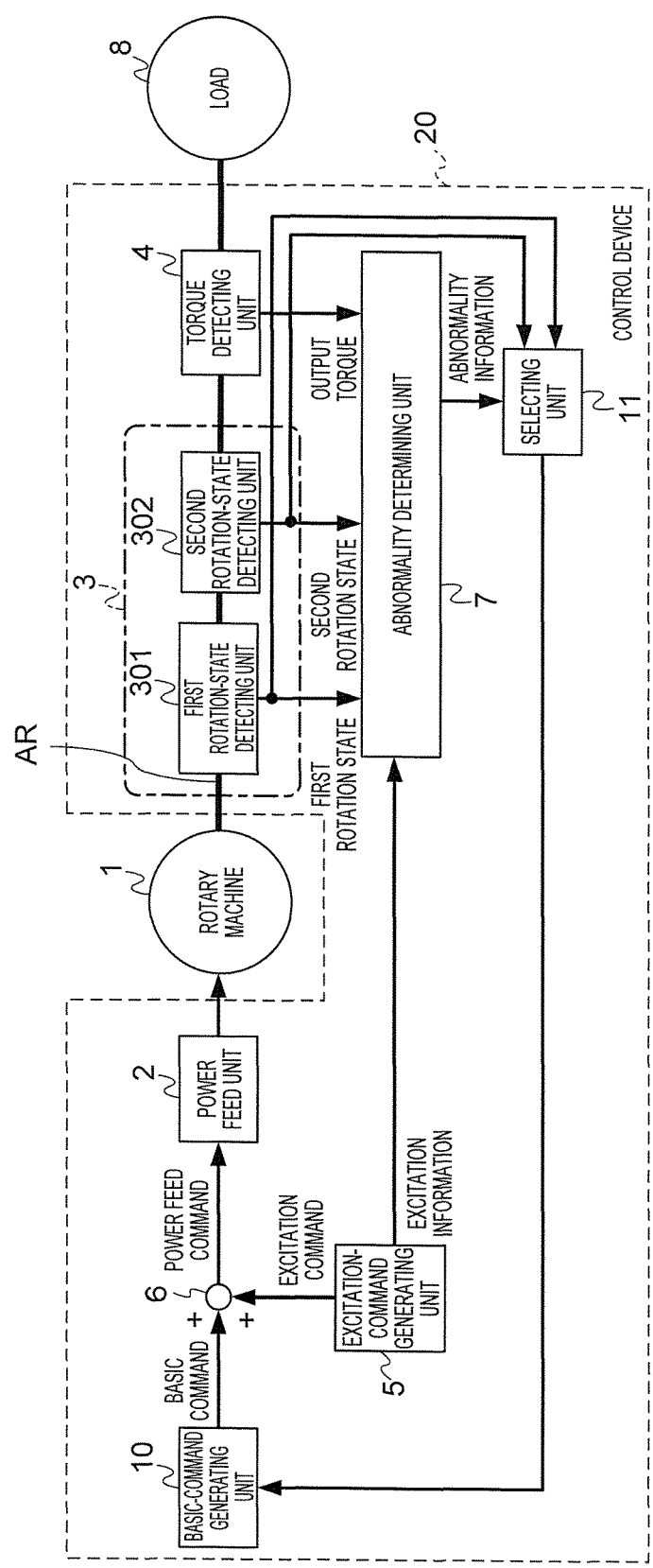
FIG. 20 is a diagram for illustrating a configuration of a control device for a rotary machine according to a thirteenth embodiment of the present invention and a periphery thereof.

FIG. 20 is a diagram for illustrating a configuration of a control device for a rotary machine according to a thirteenth embodiment of the present invention and a periphery thereof. In addition to the configuration described in the eleventh embodiment described above, the abnormality determining unit 7 inputs, as abnormality information, which detecting unit is specified as being abnormal to the selecting unit 11 in this embodiment as illustrated in FIG. 20. When any one of the first rotation-state detecting unit 301 and the second rotation-state detecting unit 302 is abnormal, the selecting unit 11 selects the output torque output from the other normal one and inputs the output torque to the basic-command generating unit 10.

In a normal state without the occurrence of an abnormality, the basic-command generating unit 10 generates the basic command based on the rotation state of the first rotation-state detecting section 301, which is output from the selecting unit 11. However, when any one of the first rotation-state detecting unit 301 and the second rotation-state detecting unit 302 is determined as being abnormal in the abnormality determining unit 7, the basic command is generated based on the rotation state of the normal system, which is selected by the selecting unit 11 based on the abnormality information. In this manner, if one of the two systems corresponding to the detecting units is abnormal, the control is continued based on the other normal one.

Next, when one of the two systems corresponding to the rotation-state detecting units 301 and 302 is abnormal, the comparison and determination section 703 (FIG. 18) compares the excitation-response amplitude of the converted rotational position θt and the excitation-response amplitude of the output torque Ts of the normal system with each other based on the excitation-response amplitudes output from the excitation-response computing units 702. Then, it is determined whether or not a difference between the excitation-response amplitudes exceeds a predetermined value that is determined within a normal error range. When a time period in which the difference exceeds the predetermined value becomes a predetermined time period or longer, it is determined that a new abnormality occurs in the rotation-state detecting unit (301 or 302) or the torque detecting unit 4 of the system that has been treated as normal. Specifically, a second secondary abnormality in the two detecting units is detected. After the detection of the secondary failure, the comparison and determination section 703 performs a procedure of stopping the control of the rotary machine 1 or the like.

The rotation-state detecting unit includes two systems corresponding to the first rotation-state detecting unit 301 and the second rotation-state detecting unit 302 configured to respectively output the first rotation state and the second rotation state. When any one of the first rotation state and the second rotation state is abnormal, the control device continues the control of the rotary machine 1 based on the rotation state of the normal system. The abnormality determining unit 7 determines the abnormality based on the response of the rotation state and the response of the output torque of the normal system to the excitation command. Because of the configuration described above, in addition to the effects produced by the eleventh embodiment, a remarkable effect of enabling approximately constant specification of the abnormal detecting unit with high accuracy even after one of the two systems becomes abnormal, which is not obtained hitherto, can be obtained only by providing two systems for one of the detecting units configured to detect the two different state variables of the rotary machine 1 without providing three systems for each of the detecting units.

Fourteenth Embodiment

Figure 21:
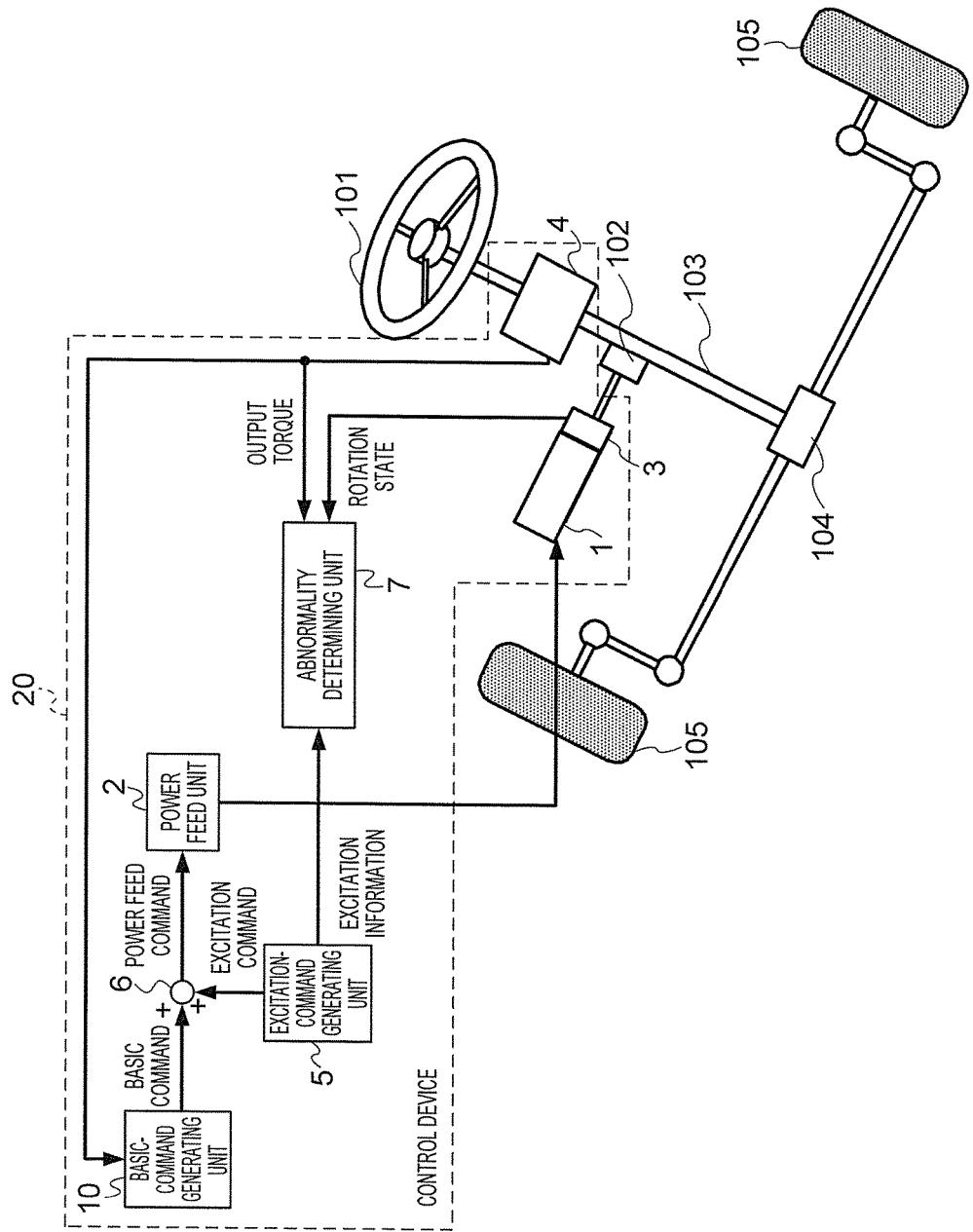
FIG. 21 is a block diagram for illustrating a configuration of an electric power steering apparatus according to a fourteenth embodiment of the present invention.

FIG. 21 is a block diagram for illustrating a configuration of an electric power steering apparatus according to a fourteenth embodiment of the present invention. The electric power steering apparatus illustrated in FIG. 21 is an example of application of the control device for a rotary machine described in each of the embodiments described above. A steering force applied to a steering wheel 101 by a driver (not shown) is transmitted to a rack via a steering shaft 103, which is the rotary shaft AR, and a rack and pinion gear 104 in the stated order to steer wheels 105. The rotary machine 1 is coupled to the steering shaft 103 via a motor speed-reduction gear 102. A torque (hereinafter also referred to as "assist force") generated by the rotary machine 1 is transmitted to the steering shaft 103 via the motor speed-reduction gear 102 to reduce the steering force to be applied by the driver for steering.

The torque detecting unit 4 detects a combined torque of the steering torque applied to the steering shaft 103 by the driver steering the steering wheel 101 and the torque generated by the rotary machine 1 as the output torque. The control device 20 determines a direction and a magnitude of the assist force to be applied by the rotary machine 1 in accordance with the output torque detected by the torque detecting unit 4 and controls a current flowing through the rotary machine 1 so as to generate the assist force. Further, the rotation-state detecting unit 3 that is mounted, for example, to the rotary machine 1 detects the rotational position or the rotation state of the rotary machine 1.

The control device 20 is constructed by combining the basic-command generating unit 10 configured to calculate the basic command corresponding to a target value of the torque to be output from the rotary machine 1 with the control device of any one of the embodiments described above. In FIG. 21, a configuration obtained by combining the basic-command generating unit 10 with the control device of the first embodiment is illustrated. However, the control device is not limited thereto. Any one of the control devices of the embodiments described above may be combined. The basic-command generating unit is already provided in the twelfth embodiment and the thirteenth embodiment, and therefore is not required to be added.

In the electric power steering apparatus, when a failure occurs and the control is stopped during running, a strong feeling of discomfort is given to the driver. The control is continued as long as possible so that the feeling of discomfort can be reduced. In order to continue excellent control as long as possible regardless of the occurrence of failure, it is desired to specify a portion of the occurrence of the failure. Further, it is desired to enable approximately constant detection of the abnormality with high accuracy in the operating state, the load state, and the friction state that change variously.

According to the electric power steering apparatus of the fourteenth embodiment, the abnormality detection accuracy can be enhanced with a simple configuration. The abnormality detectable operating state can be extended to the wide range. As a result, the control can be continued as long as possible, and hence the feeling of discomfort given to the driver can be reduced.

Figure 22:
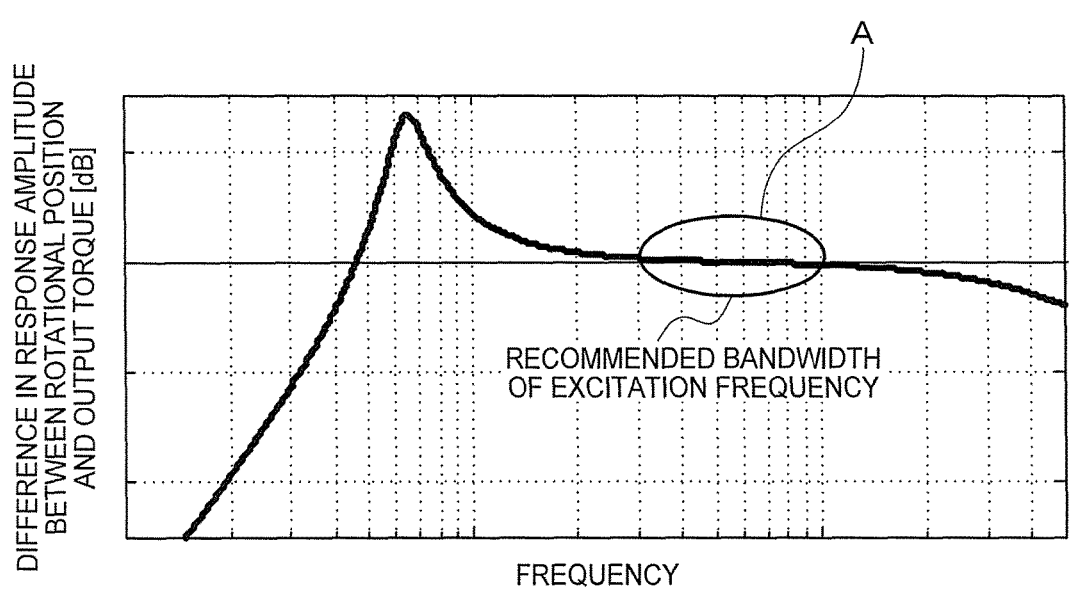
FIG. 22 is a graph for showing a frequency characteristic of a difference in response amplitude from a torque of a rotary machine to a rotational position of the rotary machine and to an output torque of a torque detecting unit in the electric power steering apparatus according to the fourteenth embodiment of the present invention.

FIG. 22 is a Bode diagram for illustrating a frequency characteristic of a difference between the response amplitudes from the torque of the rotary machine 1 to the rotational position of the rotary machine 1 and to the output torque of the torque detecting unit 4 in the electric power steering apparatus. The rotational position is converted into the converted rotational position θt. As shown in FIG. 22, a line having 0 on the vertical axis indicates no difference between the responses. A recommended bandwidth A surrounded by an oval indicates a horizontally flat characteristic in the vicinity of 0 on the vertical axis, which shows that the responses are equal to each other. The horizontally flat response means not only the amplitudes of the responses but also the phases of the responses are the same. The difference between the response amplitudes is a log taken for a ratio of the response amplitudes. Here, the recommend bandwidth can be described as a bandwidth in which the difference between the response amplitudes of the rotational position and the output torque exhibits a horizontally flat characteristic. Further, as indicated by the presence of a resonance point on a lower frequency side of the oval, the recommended bandwidth is a frequency bandwidth that is higher than the resonance point determined by the inertia of the rotary machine 1 and the inertia of the load 8.

Through selection of the excitation command so as to contain the sine wave at the frequency within the recommended bandwidth in which the responses of the output torque and the rotation state are approximately equal or equal to each other, the abnormality can be approximately constantly detected with high accuracy by, based on the responses of the rotation-state detecting unit and the torque detecting unit configured to respectively detect the different state variables to the excitation command, mutually referring to the excitation responses of the detecting units.

Further, the characteristic of the difference between the response amplitudes from the torque of the rotary machine 1 to the rotational position of the rotary machine 1 and the output torque of the torque detecting unit 4 is present not only in the electric power steering apparatus. When the rotary machine and an apparatus to which the rotary machine is applied are determined, the same characteristic can be known. Therefore, the method of setting the excitation frequency within the recommended bandwidth described above is applicable to all the embodiments described above, and the same effects can be obtained thereby.

Further, although the current command is used as the power feed command in the configurations of the embodiments described above, a torque command may be used instead. The current and the torque are generally proportional to each other, and therefore the same effects as those described are obtained.

Further, although the current command is used as the power feed command in the configurations described above, a voltage command may be used instead. In this case, the current control section (see the current control section 201 illustrated in FIG. 3) may be placed out of the power feed unit (for example, see the power feed unit 2 illustrated in FIG. 1) so that a basic command that is a main component of the voltage command is generated based on a separately determined current command and the excitation command may be added to the basic command. In this case, the power feed unit supplies electric power to the rotary machine based on the power feed command that is the voltage command. For the transmission from the excitation command to the excitation response, a difference is generated for a response characteristic from the voltage to the current as compared with the above-mentioned case where the current command is used as the power feed command. However, the difference can be grasped in advance to be easily corrected. Thus, the same effects as those described above can be obtained.

Note that, the present invention is not limited to each of the above-mentioned embodiments, and includes all the possible combinations of those embodiments.

INDUSTRIAL APPLICABILITY

The control device for a rotary machine according to the present invention is applicable to a mechanism including a rotary machine in various fields.

REFERENCE SIGNS LIST

1 rotary machine, 2 power feed unit, 3 rotation-state detecting unit, 4 torque detecting unit, 5 excitation-command generating unit, 6 adder unit, 7 abnormality determining unit, 8 load, 10 basic-command generating unit, 11 selecting unit, 20 control device, 101 steering wheel, 102 motor speed-reduction gear, 103 steering shaft, 104 rack and pinion gear, 105 wheel, 201 current control section, 202 power converting section, 301 first rotation-state detecting unit, 302 second rotation-state detecting unit, 401 first torque detecting unit, 402 second torque detecting unit, 701 reference-wave generating section, 702, 702a, 702b, 702c excitation-response computing unit, 703 comparison and determination section, 704 dimension converting section, 705 90-deg phase shift section, 711 frequency detecting section, 712 transmission computing section, 7021 multiplying section, 7021-1, 7021-2 multiplier, 7022 integrating section, 7022-1, 7022-2 integrator, 7023a amplitude computing section, 7023b phase computing section, 7024 AC-component extracting section, 7025 averaging section.

The invention claimed is:

1. A control device for a rotary machine, comprising:
    a power feed unit configured to feed electric power in accordance with a power feed command to the rotary machine;
    a rotation-state detecting unit configured to detect a rotation state of the rotary machine;
    a torque detecting unit configured to detect an output torque output from the rotary machine;
    an abnormality determining unit configured to determine an abnormality in the rotation-state detecting unit or the torque detecting unit; and
    an excitation-command generating unit configured to generate an excitation command for oscillating the rotary machine,
    wherein the power feed command is generated based at least on the excitation command,
    the excitation-command includes a frequency in which a response of the output torque and a response of the rotation-state are approximately equal, and any one or more of the frequency, a phase and an amplitude of the excitation-command is used as an excitation information,
    and the abnormality determining unit is configured to obtain the response of the rotation state and the response of the output torque to the excitation-command based on the excitation information, and determine the abnormality in the rotation-state detecting unit or the torque detecting unit based on a response of the rotation state and a response of the output torque to the excitation command.

2. The control device for a rotary machine according to claim 1, wherein:
    the excitation-command generating unit is configured to output a feature quantity of the excitation command as excitation information; and
    the abnormality determining unit is configured to obtain the responses based on the excitation information to determine the abnormality.

3. The control device for a rotary machine according to claim 2, wherein the excitation command contains a sine wave.

4. The control device for a rotary machine according to claim 3, wherein:
    the abnormality determining unit is configured to compute amplitudes or phases of the response of the rotation state and the response of the output torque to the excitation command based on the frequency of the excitation command, to thereby determine the abnormality based on the amplitudes or the phases.

5. The control device for a rotary machine according to claim 1, wherein the abnormality determining unit is configured to determine the abnormality based on an amplitude of the response of the rotation state and an amplitude of the response of the output torque to the excitation command.

6. The control device for a rotary machine according to claim 1, wherein the abnormality determining unit is configured to extract an AC component of the rotation state and an AC component of the output torque to the excitation command, and obtain the responses based on the AC components to determine the abnormality.

7. The control device for a rotary machine according to claim 1, wherein the rotation-state detecting unit is configured to detect or compute a rotational position or a rotation speed of the rotary machine.

8. The control device for a rotary machine according to claim 1, wherein the abnormality determining unit is configured to determine the abnormality based on a value obtained by multiplying the response of the rotation state or the response of the output torque to the excitation command by a correction gain.

9. The control device for a rotary machine according to claim 1, wherein the abnormality determining unit is configured to perform filter processing including integration on one of the output of the rotation-state detecting unit or the output of the torque detecting unit.

10. The control device for a rotary machine according to claim 1, wherein:
the torque detecting unit includes two systems corresponding to a first torque detecting unit and a second torque detecting unit configured to respectively output a first output torque and a second output torque; and
when one of the response of the rotation state, a response of the first output torque, or a response of the second output torque to the excitation command is different from the other remaining two of the response of the rotation state, the response of the first output torque, and the response of the second output torque to the excitation command, the abnormality determining unit determines that the abnormality occurs in the rotation-state detecting unit, the first torque detecting unit, or the second torque detecting unit, which exhibits the different response.

11. The control device for a rotary machine according to claim 1, wherein:
the torque detecting unit includes two systems corresponding to a first torque detecting unit and a second torque detecting unit configured to respectively output a first output torque and a second output torque;
when any one of the first torque detecting unit and the second torque detecting unit is abnormal, the control device continues control of the rotary machine based on an output torque of a normal system; and
the abnormality determining unit is configured to determine the abnormality based on a response of the rotation state and a response of the output torque of the normal system to the excitation command.

12. The control device for a rotary machine according to claim 1, wherein:
the rotation-state detecting unit includes two systems corresponding to a first rotation-state detecting unit and a second rotation-state detecting unit configured to respectively output a first rotation state and a second rotation state; and
when one of a response of the first rotation state, a response of the second rotation state, or the response of the output torque to the excitation command is different from the other remaining two of the response of the first rotation state, the response of the second rotation state, or the response of the output torque to the excitation command, the abnormality determining unit determines that the abnormality occurs in the first rotation-state detecting unit, the second rotation-state detecting unit, or the torque detecting unit, which exhibits the different response.

13. The control device for a rotary machine according to claim 1, wherein:
the rotation-state detecting unit includes two systems corresponding to a first rotation-state detecting unit and a second rotation-state detecting unit configured to respectively output a first rotation state and a second rotation state;
when any one of the first rotation-state detecting unit and the second rotation-state detecting unit is abnormal, the control device continues control of the rotary machine based on a rotation state of a normal system; and
the abnormality determining unit is configured to determine the abnormality based on a response of the rotation state and a response of an output torque of the normal system to the excitation command.

14. The control device for a rotary machine according to claim 1, wherein the excitation-command generating unit is configured to change theme amplitude of the excitation command in accordance with the rotation state or the output torque.

15. The control device for a rotary machine according to claim 1, wherein the power feed command is obtained by superimposing the excitation command onto a basic command for causing the rotary machine to make basic rotation.

16. The control device for a rotary machine according to claim 15, wherein the excitation-command generating unit is configured to change the amplitude of the excitation command in accordance with the basic command.

17. An electric power steering apparatus, comprising the control device for a rotary machine of claim 1, the electric power steering apparatus being configured to transmit a torque generated by the rotary machine to a steering shaft.

18. The electric power steering apparatus according to claim 17, wherein the excitation command contains a sine wave at the frequency at which the response of the output torque and the response of the rotation state are substantially equal to each other.

* * * * *